(12) United States Patent
Gruner et al.

(10) Patent No.: US 8,999,550 B2
(45) Date of Patent: Apr. 7, 2015

(54) CHARGE STORAGE DEVICES CONTAINING CARBON NANOTUBE FILMS AS ELECTRODES AND CHARGE COLLECTORS

(75) Inventors: George Gruner, Los Angeles, CA (US); Martti Kaempgen, Hann.-Muenden (DE); Andreas Kiebele, Aesch (CH)

(73) Assignee: The Regents of the University of California, Oakland, CA (US)

( * ) Notice: Subject to any disclaimer, the term of this patent is extended or adjusted under 35 U.S.C. 154(b) by 427 days.

(21) Appl. No.: 12/576,937

(22) Filed: Oct. 9, 2009

(65) Prior Publication Data

US 2010/0178543 A1    Jul. 15, 2010

Related U.S. Application Data

(63) Continuation-in-part of application No. PCT/US2008/004593, filed on Apr. 10, 2008.

(60) Provisional application No. 60/907,587, filed on Apr. 10, 2007, provisional application No. 60/929,809, filed on Jul. 13, 2007.

(51) Int. Cl.
| | |
|---|---|
| *H01M 4/48* | (2010.01) |
| *H01M 4/485* | (2010.01) |
| *H01M 4/52* | (2010.01) |
| *H01M 4/525* | (2010.01) |
| *H01M 4/583* | (2010.01) |
| *H01M 2/26* | (2006.01) |
| *H01M 4/66* | (2006.01) |
| *B82Y 30/00* | (2011.01) |

(52) U.S. Cl.
CPC .............. *H01M 4/663* (2013.01); *B82Y 30/00* (2013.01)

(58) Field of Classification Search
USPC .............. 429/231.8, 218, 101, 209, 527, 532, 429/121, 212, 231.3, 231.95; 29/25.03; 361/502, 503; 423/447.3
See application file for complete search history.

(56) References Cited

U.S. PATENT DOCUMENTS

| | | | | |
|---|---|---|---|---|
| 4,634,502 A | * | 1/1987 | Callahan et al. | ............... 205/148 |
| 5,879,836 A | * | 3/1999 | Ikeda et al. | ................ 429/231.8 |
| 6,454,816 B1 | * | 9/2002 | Lee et al. | ..................... 29/25.03 |

(Continued)

FOREIGN PATENT DOCUMENTS

| | | |
|---|---|---|
| EP | 1724785 A1 * | 11/2006 |
| KR | 20060042144 A | 5/2006 |

OTHER PUBLICATIONS

Kaempgen, M. et al., "Bifunctional carbon nanotube networks for supercapacitors", Applied Physics Letters 90, 264104, p. 1-2, Jun. 28, 2007.*

Claye, A.S. et al., "Solid-State Electrochemistry of the Li Single Wall Carbon Nanotube System", Journal of the Electrochemical Society, 147 (8), p. 2845-2852, 2000.*

(Continued)

*Primary Examiner* — Kenneth Douyette
(74) *Attorney, Agent, or Firm* — John P. O'Banion

(57) ABSTRACT

An energy storage device includes a nanostructured network and an electrolyte in contact with the nanostructured network. The nanostructured network is an electrically conducting nanostructured network that provides combined functions of an electrode and a charge collector of the energy storage device. An electrical device includes an energy storage device that includes a nanostructured network and an electrolyte in contact with the nanostructured network, and a load-bearing electrical circuit electrically connected to the electrical energy storage device. The energy storage device is suitable to power the electrical device while in operation.

22 Claims, 39 Drawing Sheets

(56) References Cited

U.S. PATENT DOCUMENTS

| | | | |
|---|---|---|---|
| 6,672,077 B1 | 1/2004 | Bradley et al. | |
| 2002/0009637 A1* | 1/2002 | Murakami et al. | 429/213 |
| 2002/0076618 A1* | 6/2002 | Amatucci | 429/324 |
| 2002/0142202 A1* | 10/2002 | Li et al. | 429/27 |
| 2002/0182495 A1* | 12/2002 | Ogura et al. | 429/218.1 |
| 2004/0012913 A1* | 1/2004 | Andelman | 361/503 |
| 2004/0234850 A1* | 11/2004 | Watarai et al. | 429/217 |
| 2005/0147880 A1* | 7/2005 | Takahashi et al. | 429/177 |
| 2005/0221188 A1* | 10/2005 | Takami et al. | 429/231.95 |
| 2005/0238810 A1* | 10/2005 | Scaringe et al. | 427/249.1 |
| 2006/0002844 A1* | 1/2006 | Suenaga et al. | 423/447.3 |
| 2006/0115711 A1 | 6/2006 | Kim et al. | |

OTHER PUBLICATIONS

Conway, B.E.—"Transition from "Supercapacitor" to "Battery" Behavior in Electrochemical Energy Storage"—J. Electrochem. Soc., vol. 138, No. 6, Jun. 1991.

Ng, S.H. et al.—"Single wall carbon nanotube paper as anode for lithium-ion battery"—Electrochimica Acta, vol. 51, issue 1, pp. 23-28, Oct. 2005.

WIPO, counterpart PCT Application No. PCT/US2008/004593, International Publication No. WO 2008124167 dated Oct. 16, 2008, including international search report and written opinion issued on Jul. 28, 2008, pp. 1-56.

* cited by examiner

US 8,999,550 B2

CHARGE STORAGE DEVICES CONTAINING CARBON NANOTUBE FILMS AS ELECTRODES AND CHARGE COLLECTORS

CROSS-REFERENCE TO RELATED APPLICATIONS

This application claims priority from, and is a 35 U.S.C. §111(a) continuation-in-part of, PCT international application serial number PCT/US2008/004593, filed on Apr. 10, 2008, incorporated herein by reference in its entirety, which claims priority to U.S. provisional application Ser. No. 60/907,587 filed on Apr. 10, 2007, incorporated herein by reference in its entirety, and U.S. provisional application Ser. No. 60/929,809 filed on Jul. 13, 2007, incorporated herein by reference in its entirety.

This application is also related to PCT International Publication No. WO 2008/124167 published on Oct. 16, 2008, incorporated herein by reference in its entirety.

STATEMENT REGARDING FEDERALLY SPONSORED RESEARCH OR DEVELOPMENT

This invention was made with Government support under 0454540, awarded by the National Science Foundation. The Government has certain rights in the invention.

INCORPORATION-BY-REFERENCE OF MATERIAL SUBMITTED ON A COMPACT DISC

Not Applicable

BACKGROUND OF THE INVENTION

1. Field of the Invention

The present invention relates in general to charge storage devices such as supercapacitors and batteries, and more particularly to nanostructure-films deposited on substrates for use in charge storage applications.

2. Description of Related Art

The contents of all references, including articles, published patent applications and patents referred to anywhere in this specification are hereby incorporated by reference.

Some charge storage devices such as supercapacitors and batteries require high surface area materials that form a double layer with an electrolyte. Different forms of carbonaceous materials such as carbon black (M. Min et al J. Electrochem. Soc 153, A334 (2006), S-K. Kuo and L-L. Wu J. Power Sources 162,1437 (2006)) and carbon Nanotubes (CNT G. H. Deng et al Carbon 43, 1557 (2005), G-X Wang et al Solid State ionics 176, 1169 (2005)) have been used as electrode materials. The high surface area materials are used as the electrode, with the charge collectors usually metals. Such configurations can have several disadvantages, especially for applications where flexibility, light weight and thin films are required. Because of the metal charge collectors, simple, room temperature fabrication processes are not applicable. At the same time, cost and weight associated with the metal parts may be an issue.

As described herein, the term "electrode" refers to the portion of an energy storage device that physically interacts with an electrolyte to store charge (e.g., in a polarized double layer in a supercapacitor, in a chemical reaction in a battery, etc.). As described herein, the term "charge collector" refers to the electrically conductive element of an energy storage device that is in substantial physical and electrical contact with an electrode surface, and which serves to transfer charge from the electrode to an electrical contact pad (e.g., in an energy storage device wherein an electrode and a charge collector form thin films, each having essentially two planar surfaces, one of the electrode surfaces is generally in physical contact with an electrolyte while the other electrode surface is in physical and electrical contact with a charge collector surface; the contacting electrode and charge collector surfaces generally share similar perimeter dimensions). Note: as used herein, a charge collector can be distinguished from an electrical contact pad in that an electrical contact pad has a small surface perimeter relative to that of a charge collector with which it is in contact (e.g., whereas the thin-film charge collector described above has a surface perimeter similar to that of the thin-film electrode with which it is in physical and electrical contact, the perimeter of a corresponding electrical contact pad connected to the charge collector will be much smaller (e.g., less than ~40% of the surface perimeter of the charge collector).

Both batteries and supercapacitors are charge storage devices. While supercapacitors store the electrical energy in polarized double layers along the electrodes surfaces, batteries derive their energy from chemical reactions in the active materials. A battery typically consists of one or more cells which are in turn made up from two electrodes (anode and cathode) an electrolyte and a porous separator.

Batteries are classified into two groups, called primary and secondary batteries. Primary batteries can only be used once and are not rechargeable. Because of their short lifespan the materials used in these cells need to be cheap and environmental friendly. Several patents (U.S. Pat. No. 6,838,209 "Flexible thin battery and method of manufacturing same"; U.S. Pat. No. 6,858,349 "Battery cathode: carbon fibers"; U.S. Pat. No. 5,747,190 "Multilayered battery having a cured conductive ink layer") describe such devices.

In many instances, carbon black and/or metals are being used as a material for current collectors and/or to increase the conductivity of active materials ($MnO_2$/carbon black paste) and as active electrode material (Li-ion batteries) in current battery designs. The disadvantage of using carbon black for these tasks is its relatively poor electrical conductivity (as compared to metals or carbon nanotubes), which requires large amounts of this material to be used. Metal current collectors, while providing good conductivity, have the disadvantage of having a large mass. This, in turn, decreases the possible energy densities (per kg or per l).

Batteries have, in addition to an electrolyte and separator, two components: an anode and a cathode. As an example, $MnO_2$ together with an electrically conducting medium such as carbon black is used as an anode, and for a cathode, a film of Zn is used. The configuration can not be fabricated by a simple, solution based deposition process, the process required for the majority of applications.

There is thus a need for a charge storage device that is cheap, has appropriate performance and can be disposed without creating environmental hazards. An embodiment of the present invention includes a device that can use carbon nanotubes (CNTs) to function as both an electrode and a charge collector.

BRIEF SUMMARY OF THE INVENTION

An energy storage device according to an embodiment of the current invention includes a nanostructured network, and an electrolyte in contact with the nanostructured network. The nanostructured network is an electrically conducting nanostructured network that provides combined functions of an electrode and a charge collector of the energy storage device. An electrical device according to an embodiment of the current invention includes an energy storage device according to an embodiment of the current invention and a load-bearing electrical circuit electrically connected to the electrical energy storage device. The energy storage device is suitable to power the electrical device while in operation.

BRIEF DESCRIPTION OF THE SEVERAL VIEWS OF THE DRAWING(S)

The invention can be better understood by reading the following detailed description with reference to the accompanying Figures in which:

FIG. 1 is a schematic illustration of a symmetric energy storage device utilizing nanowire or nanotube electrodes arranged in a percolating network according to an embodiment of the current invention. The configuration shown represents a symmetric supercapacitor.

FIG. 2 is a schematic illustration of an asymmetric energy storage device utilizing nanowire or nanotube electrodes arranged in a percolating network according to an embodiment of the current invention. In addition, one electrode is coated with another material which becomes the active material of that electrode. The configuration shown represents an asymmetric supercapacitor or a battery.

FIG. 3 is a schematic illustration of a symmetric energy storage device utilizing multiple networks (nanowire or nanotube network arranged in a percolating network coated with another material) as electrodes according to an embodiment of the current invention. The nanowire or nanotube network acts as current collector and the top-coated material is the active material. The configuration shown represents a symmetric supercapacitor.

FIG. 4 is a schematic illustration of an asymmetric energy storage device utilizing multiple networks (nanowire or nanotube network arranged in a percolating network coated with another material that is different on both sides) as electrodes according to an embodiment of the current invention. The nanowire or nanotube network acts as a current collector and the top-coated material is the active material. The configuration shown represents both, an asymmetric supercapacitor and a battery.

FIG. 5 is a schematic illustration of an asymmetric energy storage device utilizing multiple networks as electrodes, such as shown in FIG. 4. The nanowire or nanotube network acts as a current collector and the top-coated material is the active material. In order to avoid an unwanted reaction between current collector and active material of the same electrode, an additional protective layer (e.g. poly(3,4-ethylenedioxythiophene) (PEDOT)) keeps the materials separated but electrically connected. The configuration shown represents both, an asymmetric supercapacitor and a battery.

Figure 8:
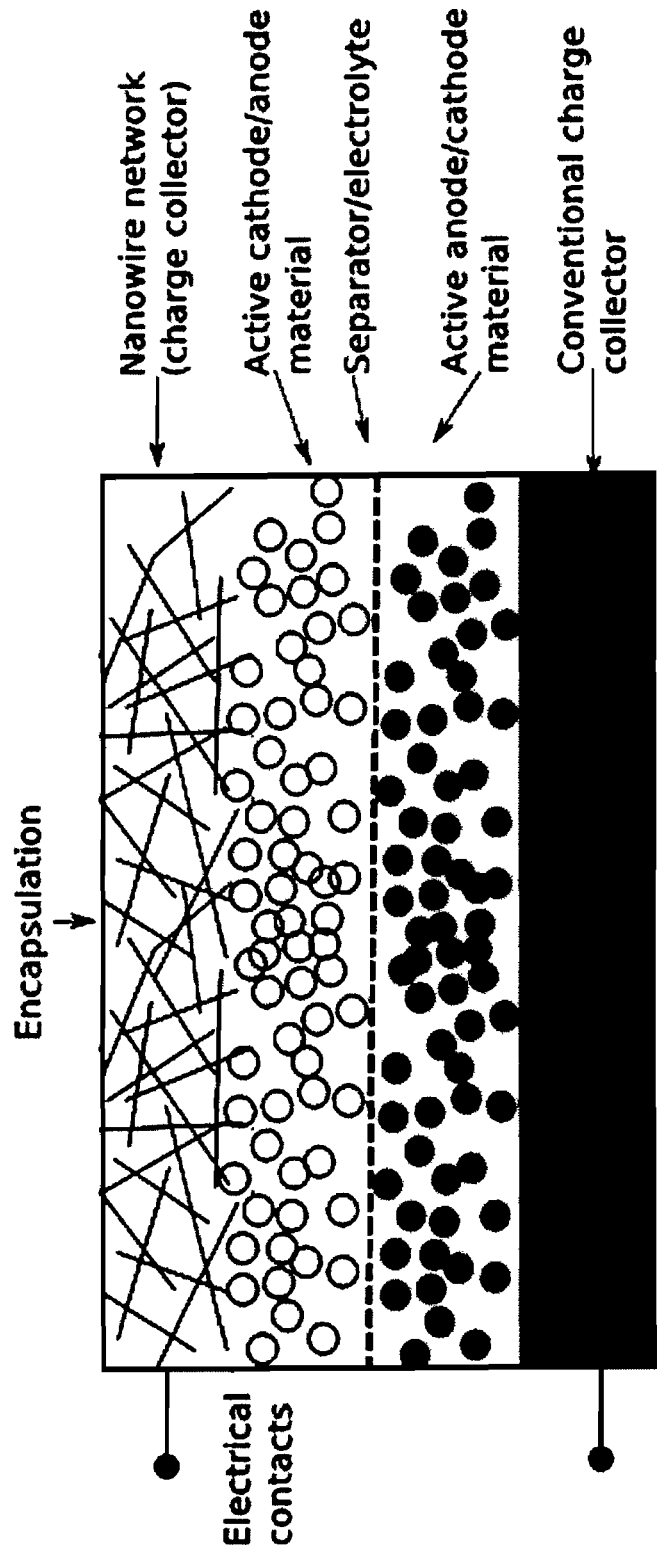

FIG. 8 is a schematic illustration of an asymmetric energy storage device utilizing a metal sheet coated with an active material as one electrode and a multiple layer electrode (nanowires or nanotubes networks coated with another material, shown here as an example) or a composite electrode as the other electrode according to an embodiment of the current invention. The configuration shown represents an asymmetric supercapacitor or a battery.

Figure 9:
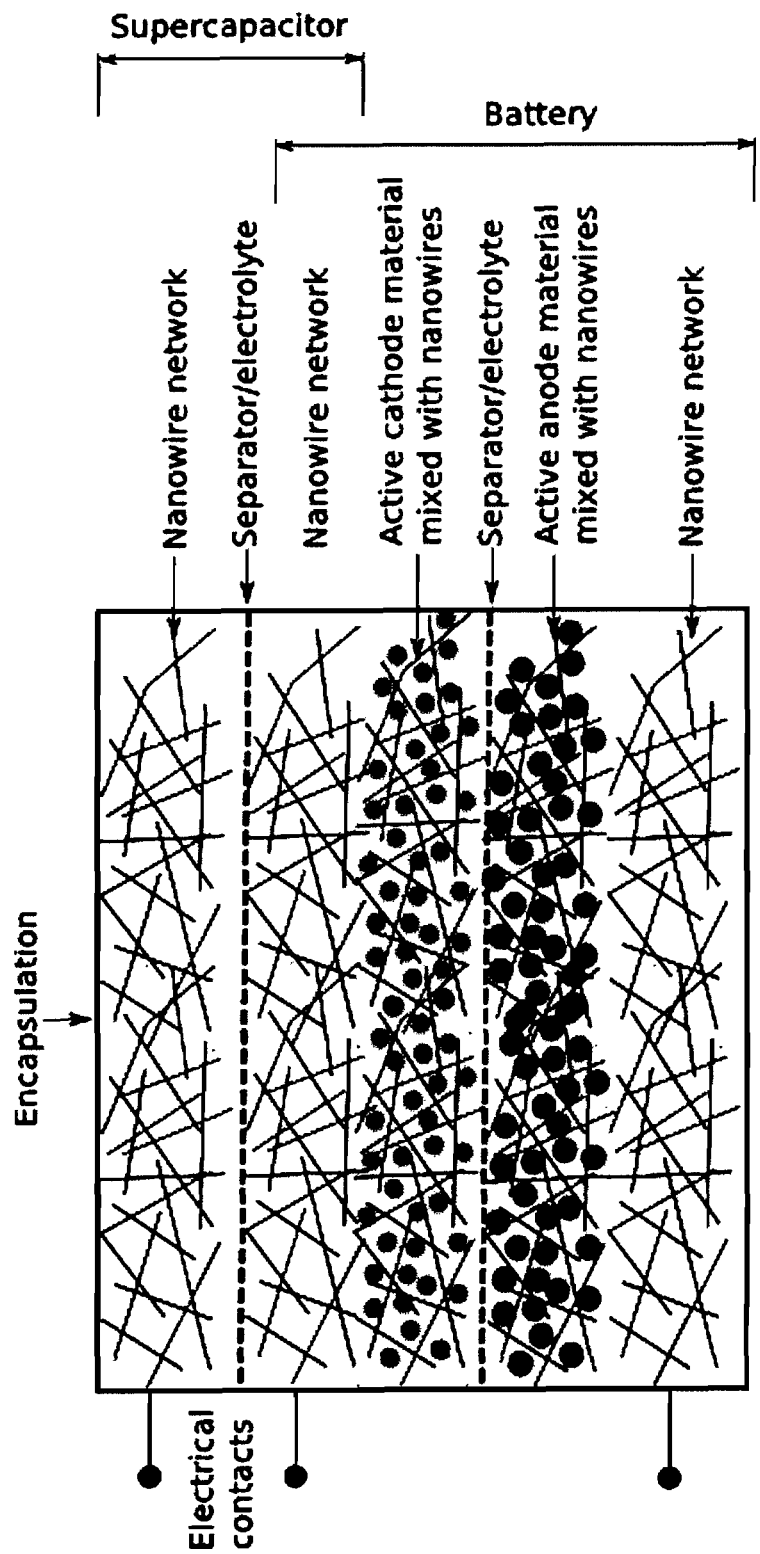

FIG. 9 is a schematic illustration of a battery and a supercapacitor combined into a single charge storage device by sharing one electrode according to an embodiment of the current invention. The supercapacitor as well as the battery can be of any type described in FIGS. 1-8.

Figure 10:
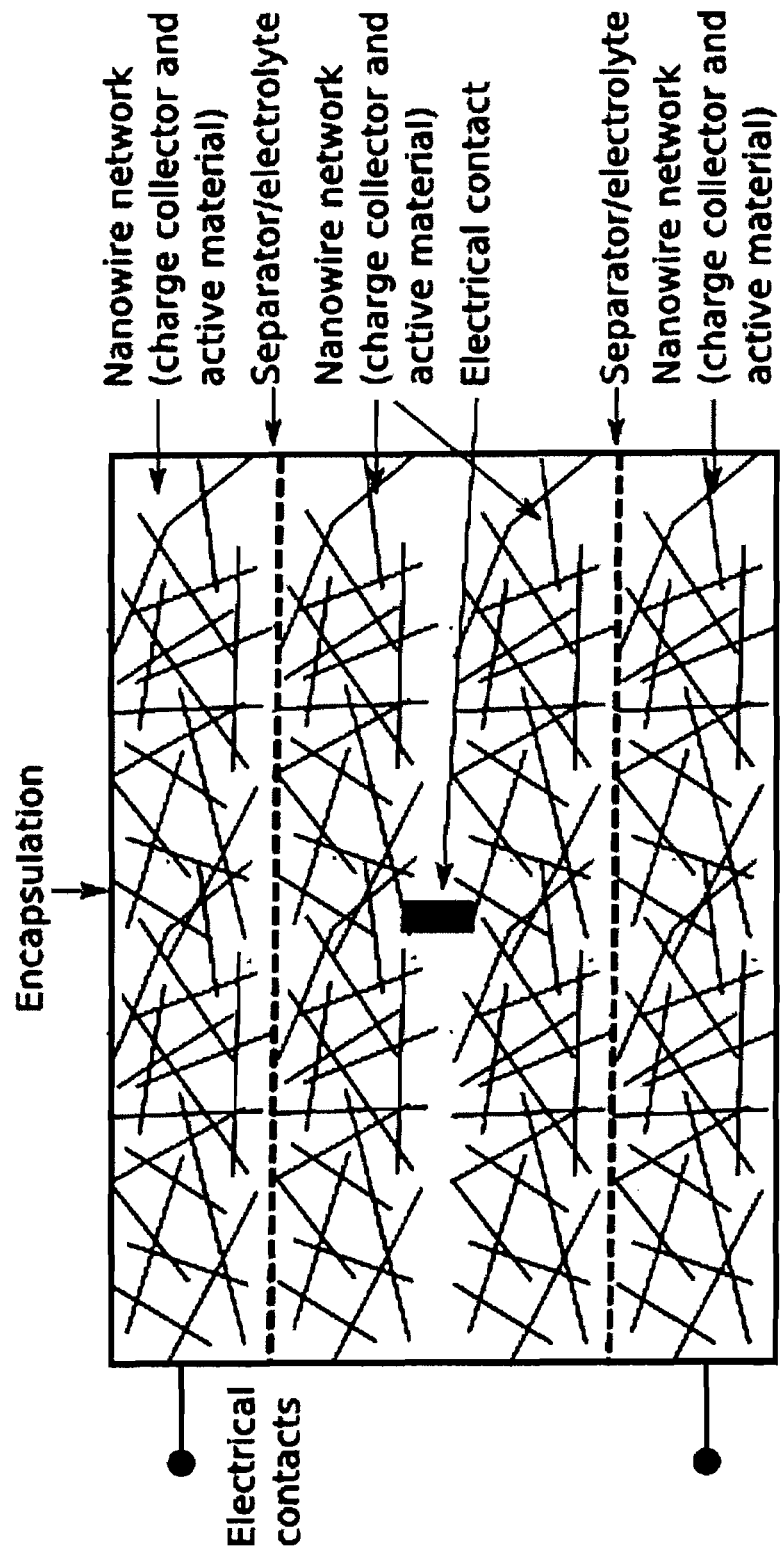

FIG. 10 is a schematic illustration of energy storage devices fabricated in a stacked fashion (in serial order) according to an embodiment of the current invention, thus increasing the total voltage output.

Figure 11:
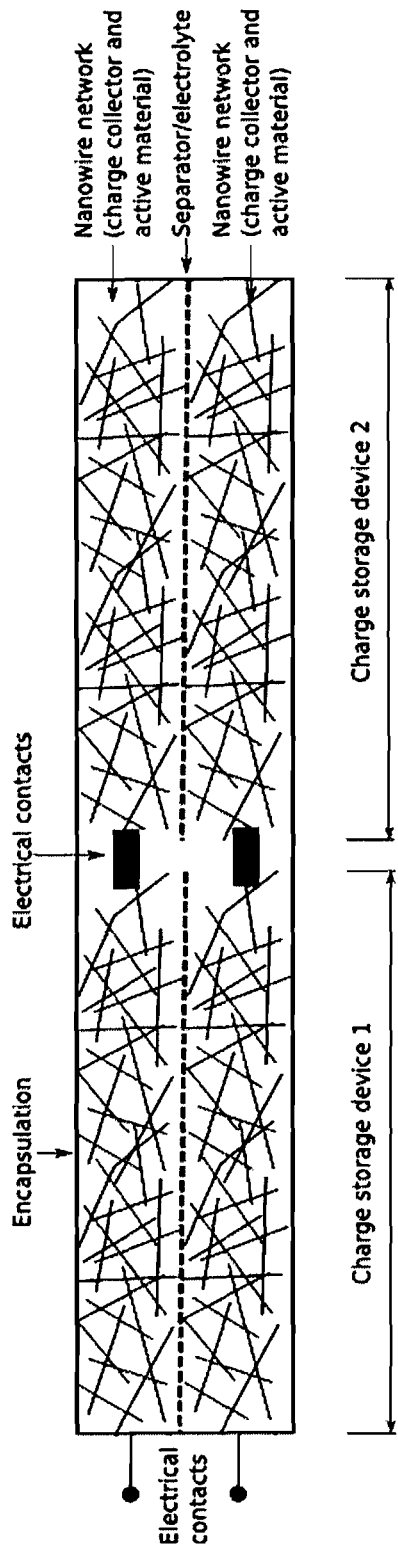

FIG. 11 is a schematic illustration of energy storage devices connected in parallel order according to an embodiment of the current invention, thus increasing the total energy output.

Figure 12:
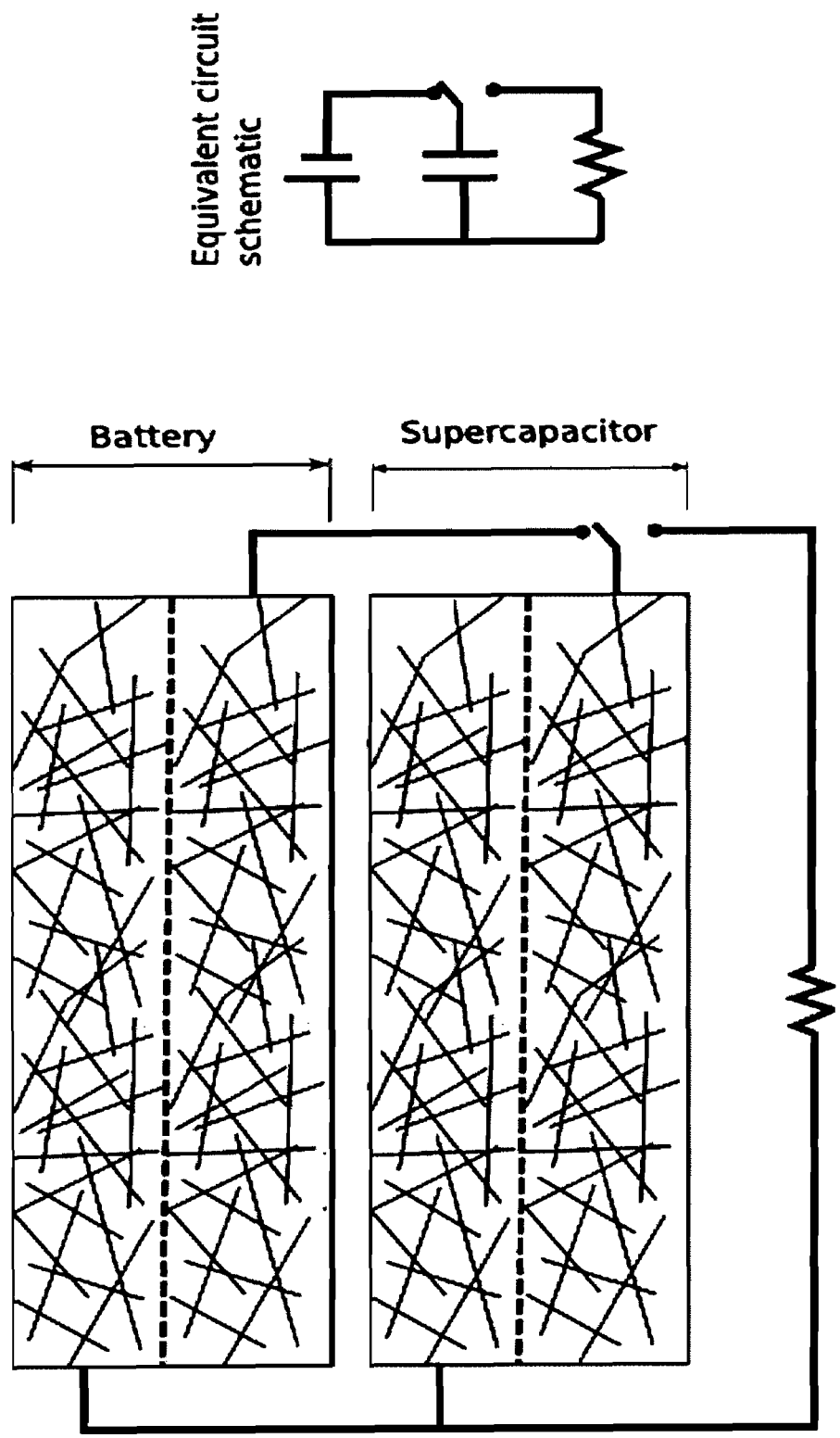

FIG. 12 is a schematic illustration of a battery device connected to a supercapacitor according to an embodiment of the current invention. This supercapacitor may be connected either by conventional means or by the nanowire/nanotube networks directly.

Figure 13:
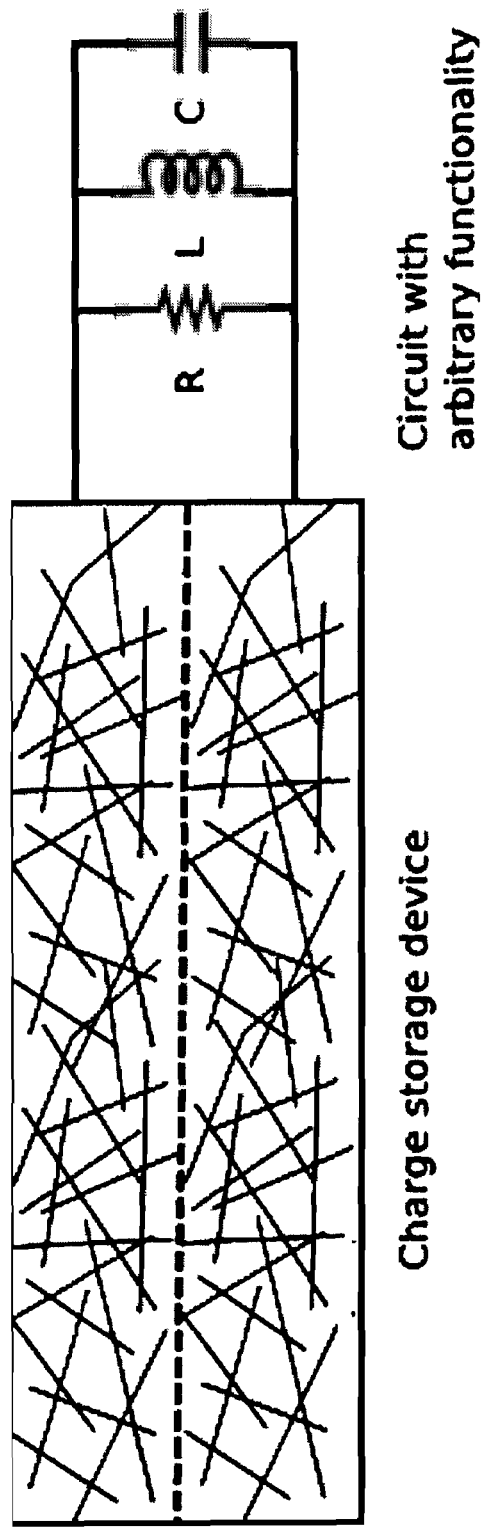

FIG. 13 is a schematic illustration of energy storage devices connected to an electrical circuit according to an embodiment of the current invention.

Figure 14:
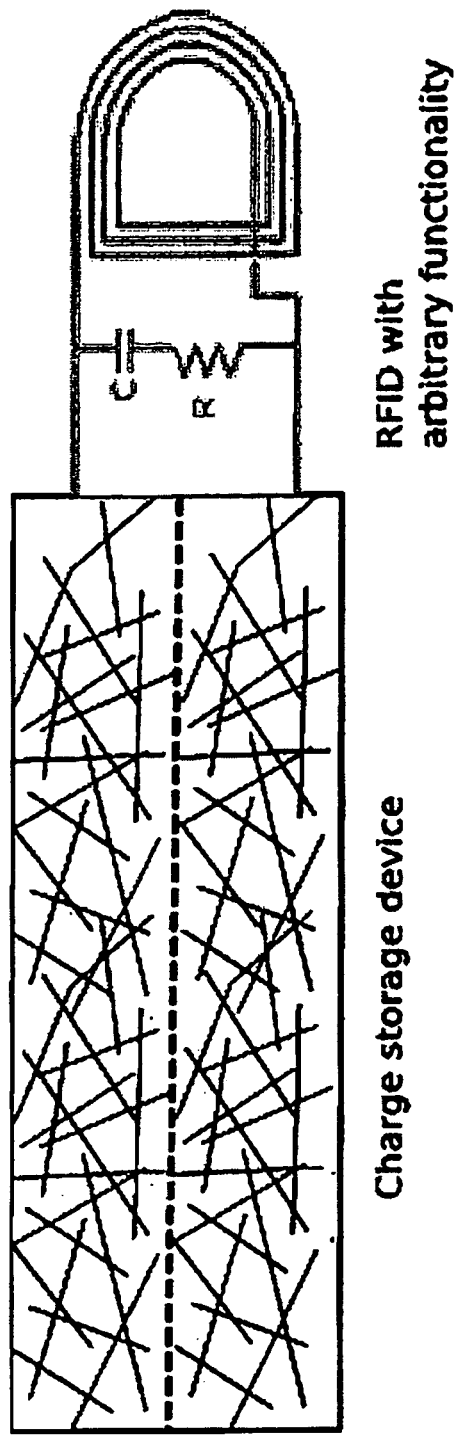

FIG. 14 is a schematic illustration of energy storage devices connected to an RFID tag according to an embodiment of the current invention.

Figure 15:
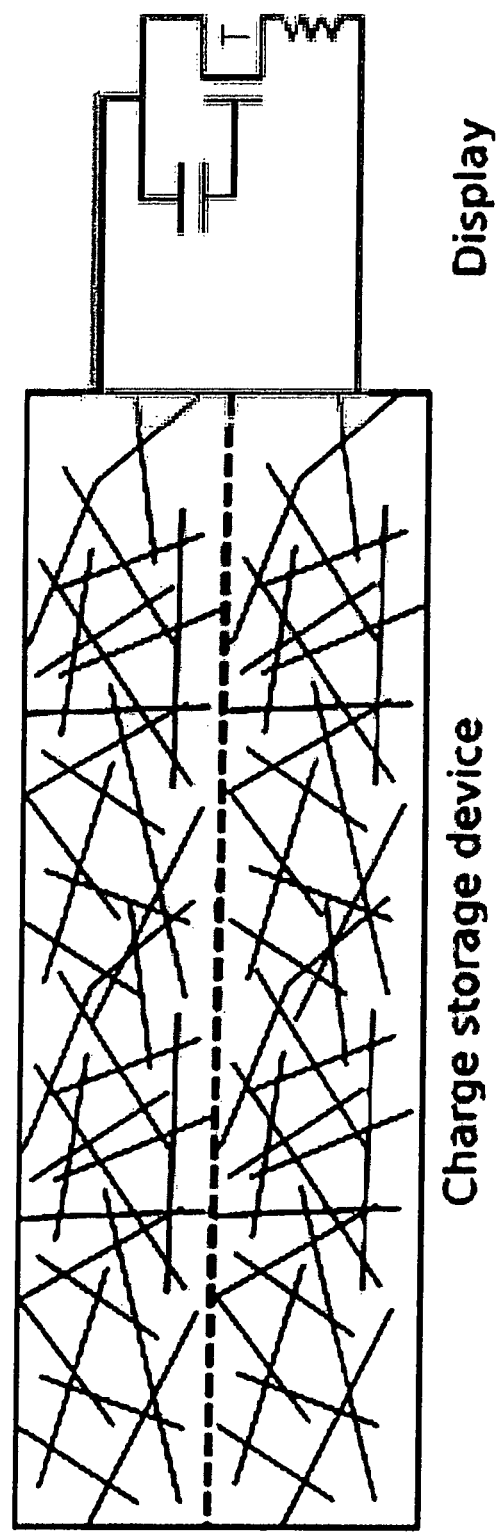

FIG. 15 is a schematic illustration of energy storage devices connected to a display according to an embodiment of the current invention.

Figure 16:
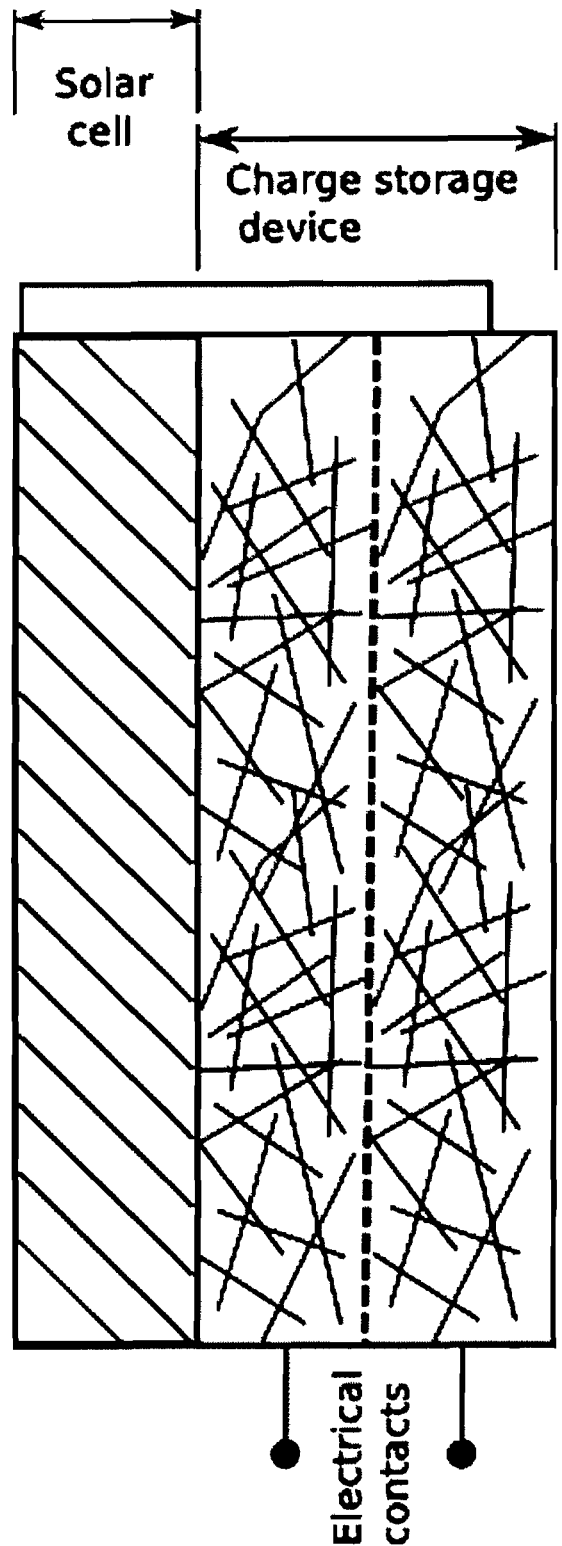

FIG. 16 is a schematic illustration of energy storage devices connected to a solar cell according to an embodiment of the current invention.

Figure 17:
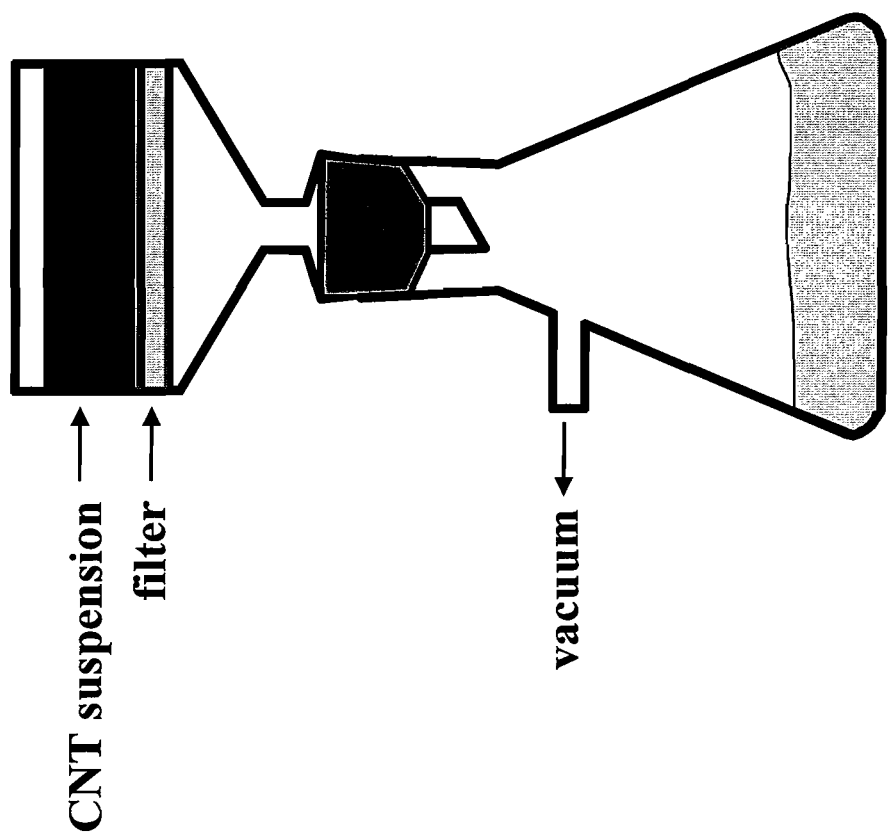

FIG. 17 is a schematic illustration of a set up to prepare carbon nanotube (CNT) networks by filtration of a CNT suspension according to an embodiment of the current invention.

Figure 18:
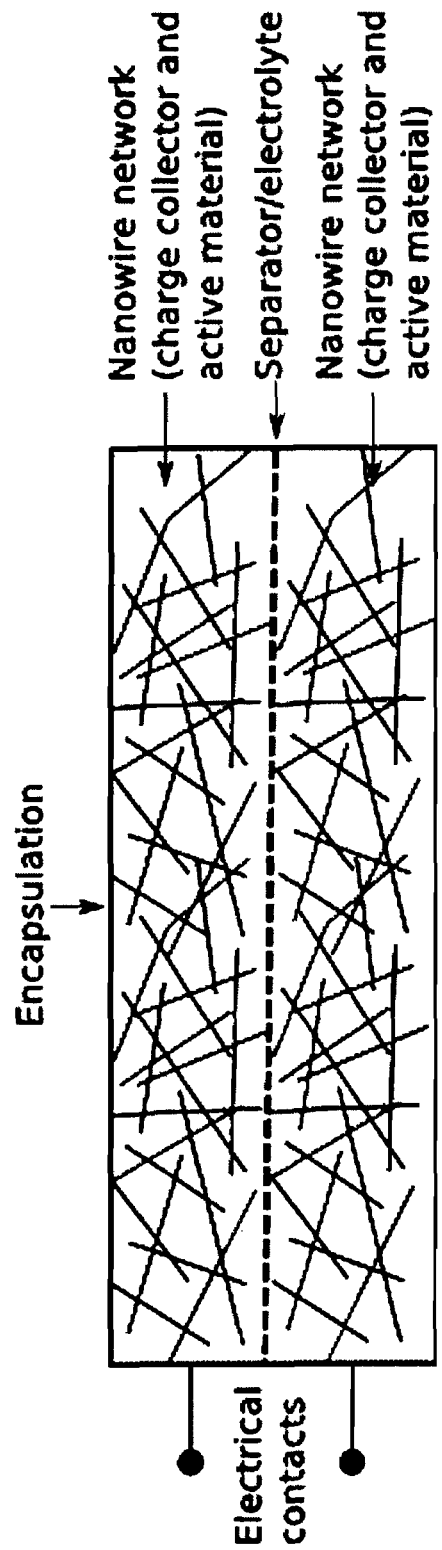

FIG. 18 is a schematic illustration of a supercapacitor using CNT networks as electrodes according to an embodiment of the current invention.

Figure 19:

FIG. 19 is a SEM (scanning electron microscope) image of a CNT network used as an electrode in the CNT supercapacitor according to an embodiment of the current invention.

Figure 20:
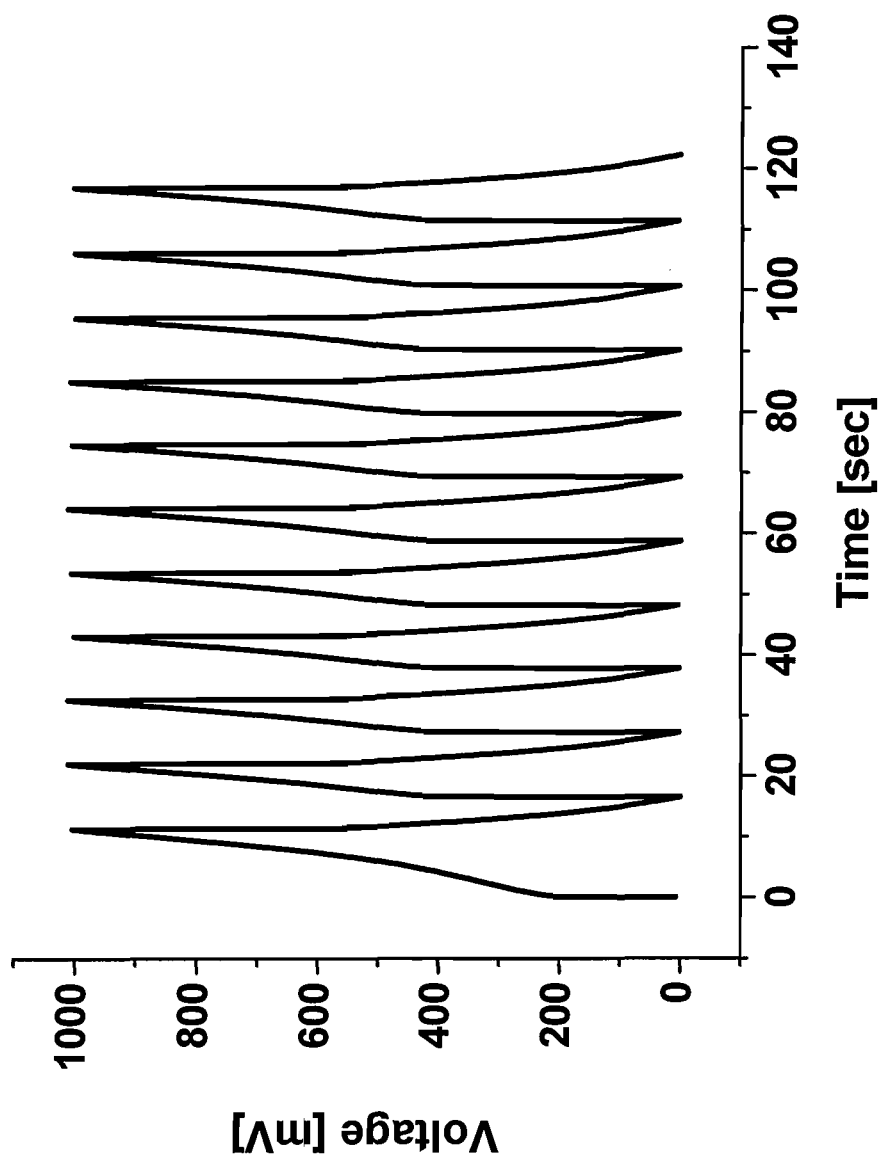

FIG. 20 shows galvanostatic charge/discharge characteristics of a CNT network supercapacitor according to an embodiment of the current invention.

Figure 21:
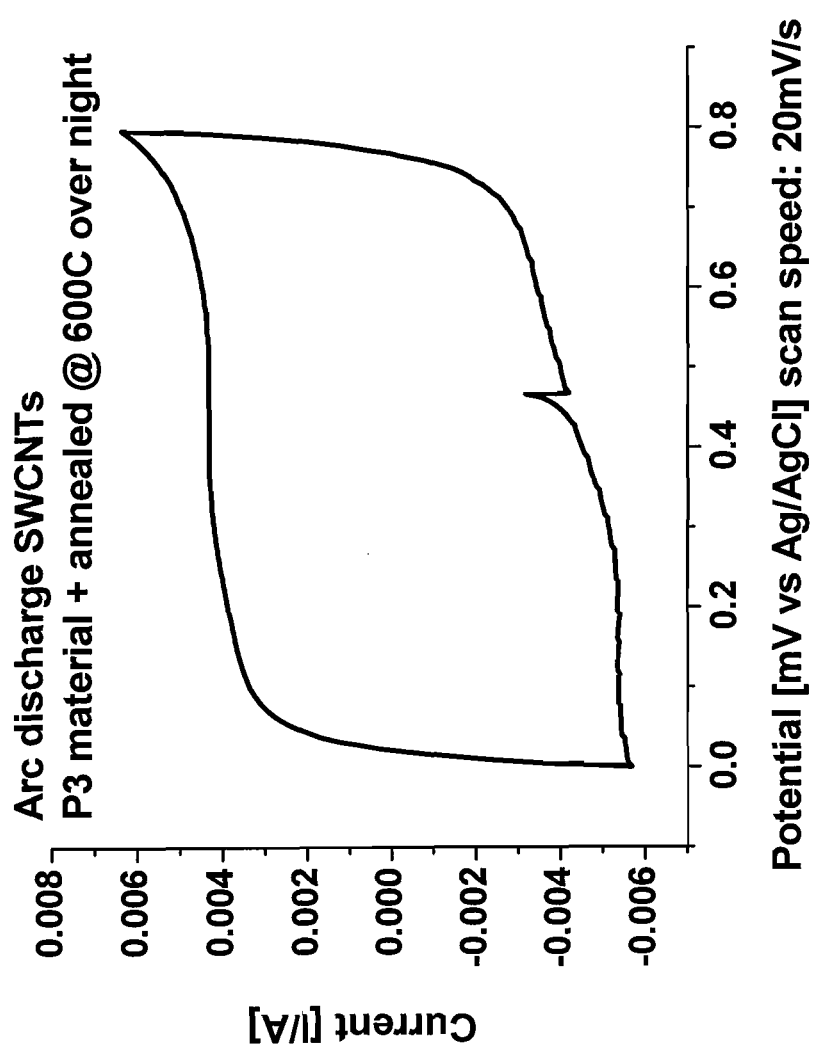

FIG. 21 shows a cyclovoltammogram of a CNT network supercapacitor according to an embodiment of the current invention.

Figure 22:
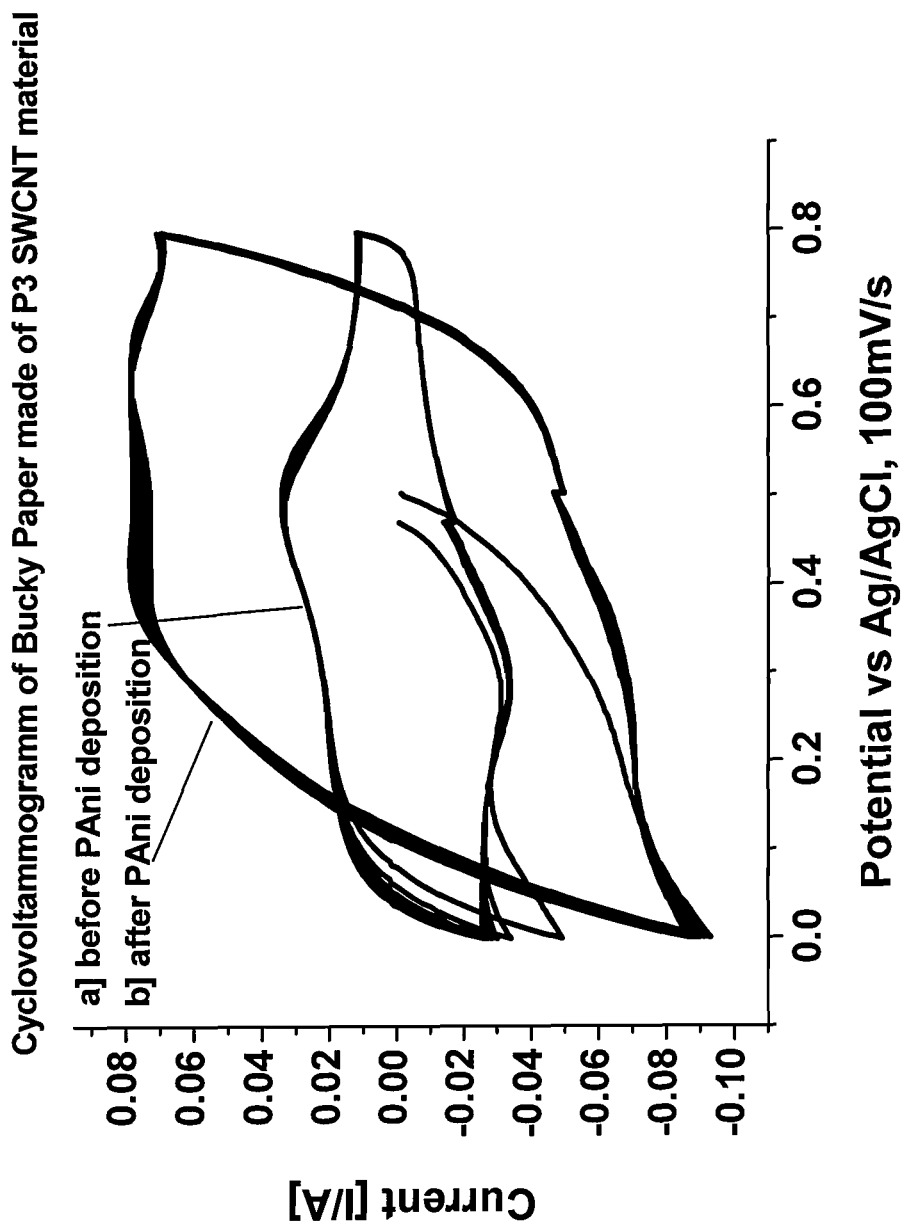

FIG. 22 shows a cyclovoltammogram of a CNT network, before (inner curve) and after (outer curve) deposition of polyaniline according to an embodiment of the current invention.

Figure 23:
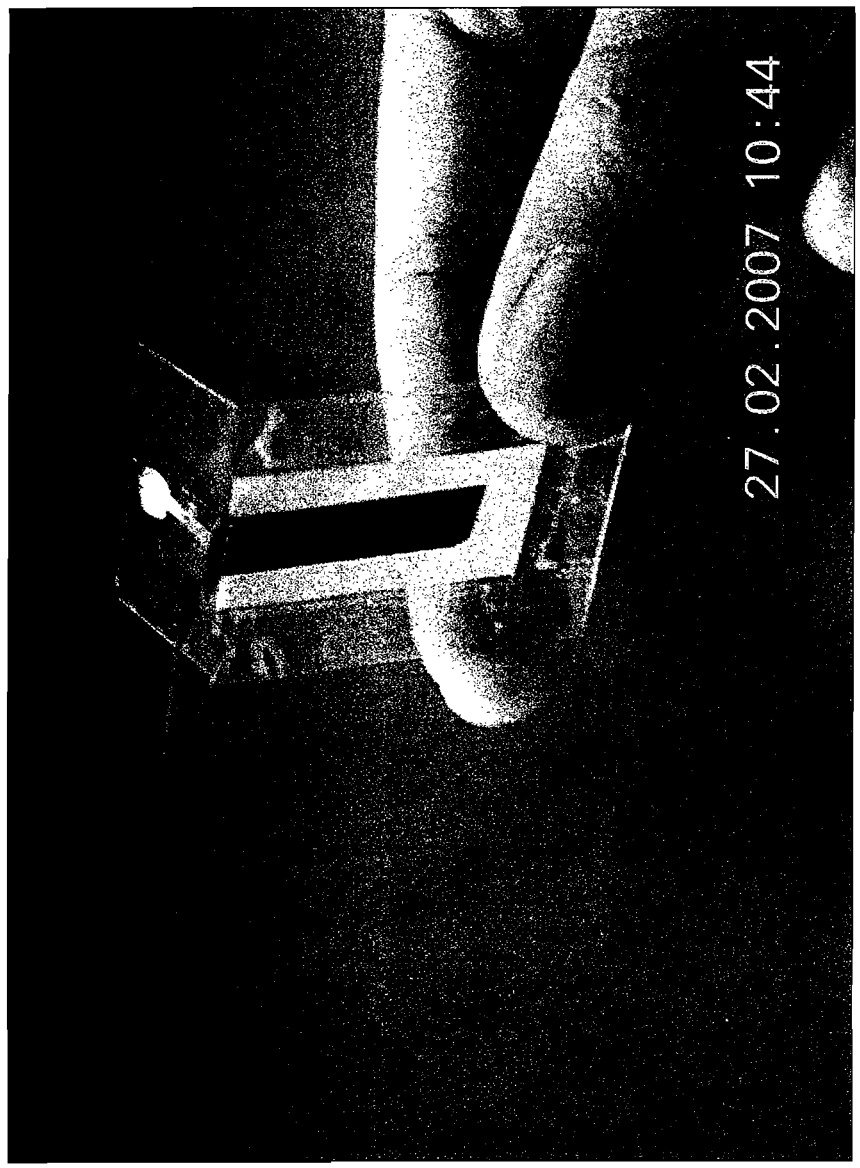

FIG. 23 an image of a CNT supercapacitor according to an embodiment of the current invention.

Figure 24:
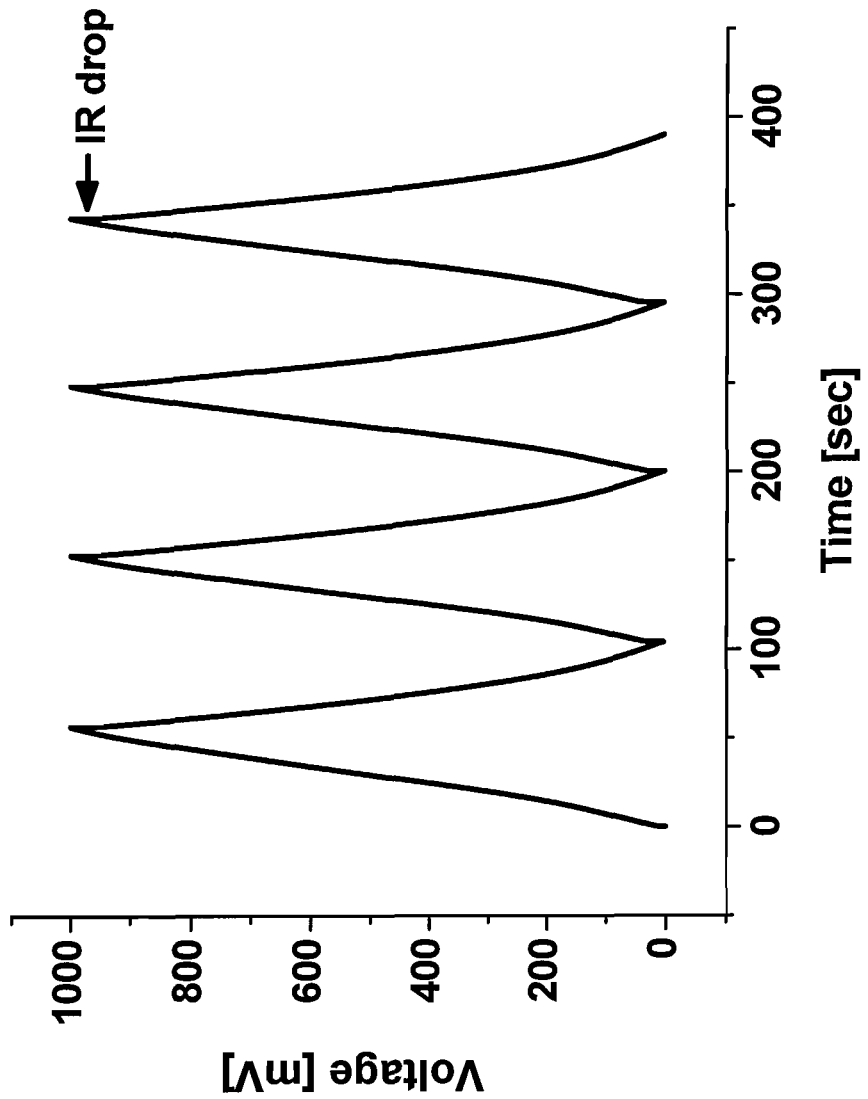

FIG. 24 shows galvanostatic charge/discharge of a sprayed CNT based supercapacitor using polyvinyl alcohol (PVA)/$H_3PO_4$ based polymer electrolyte according to an embodiment of the current invention. The current applied was 60 µA. The curves in other electrolytes investigated look very similar and are left out for clarity.

Figure 25:
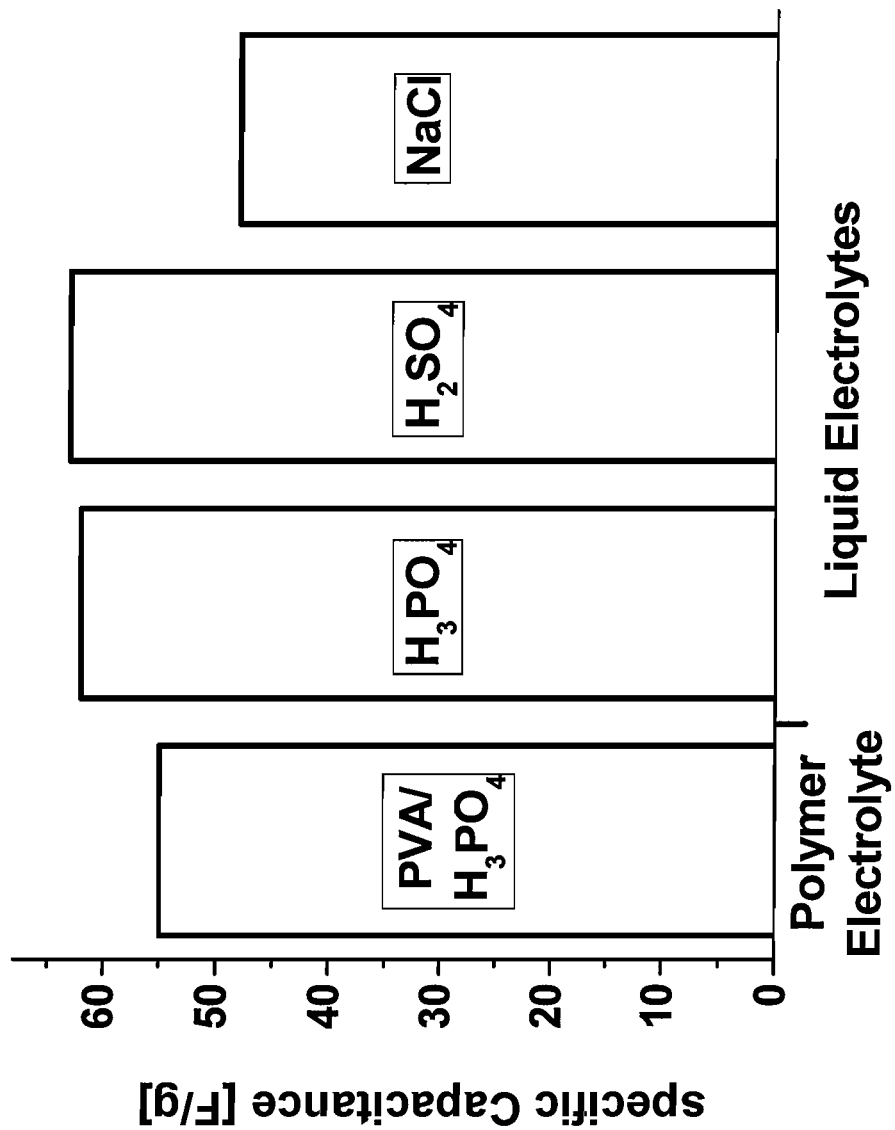

FIG. 25 shows capacitance of a sprayed CNT based supercapacitor using various liquid electrolytes and a polymer electrolyte according to an embodiment of the current invention. The same CNT network has been used for all measurements.

Figure 26:
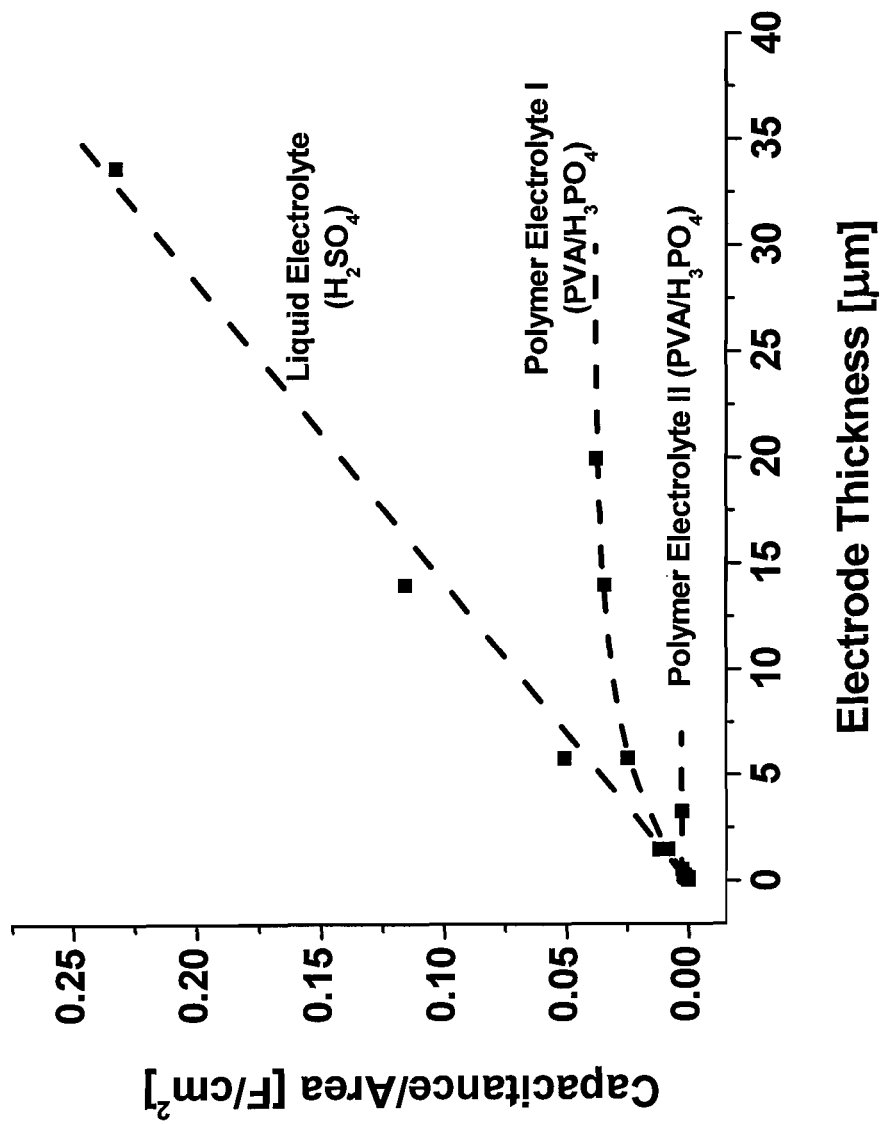

FIG. 26 shows capacitance/Area vs. electrode thickness of a CNT based supercapacitor using either a liquid electrolyte or a polymer electrolyte according to an embodiment of the current invention. PVA I contains more electrolyte than PVA II.

Figure 27:
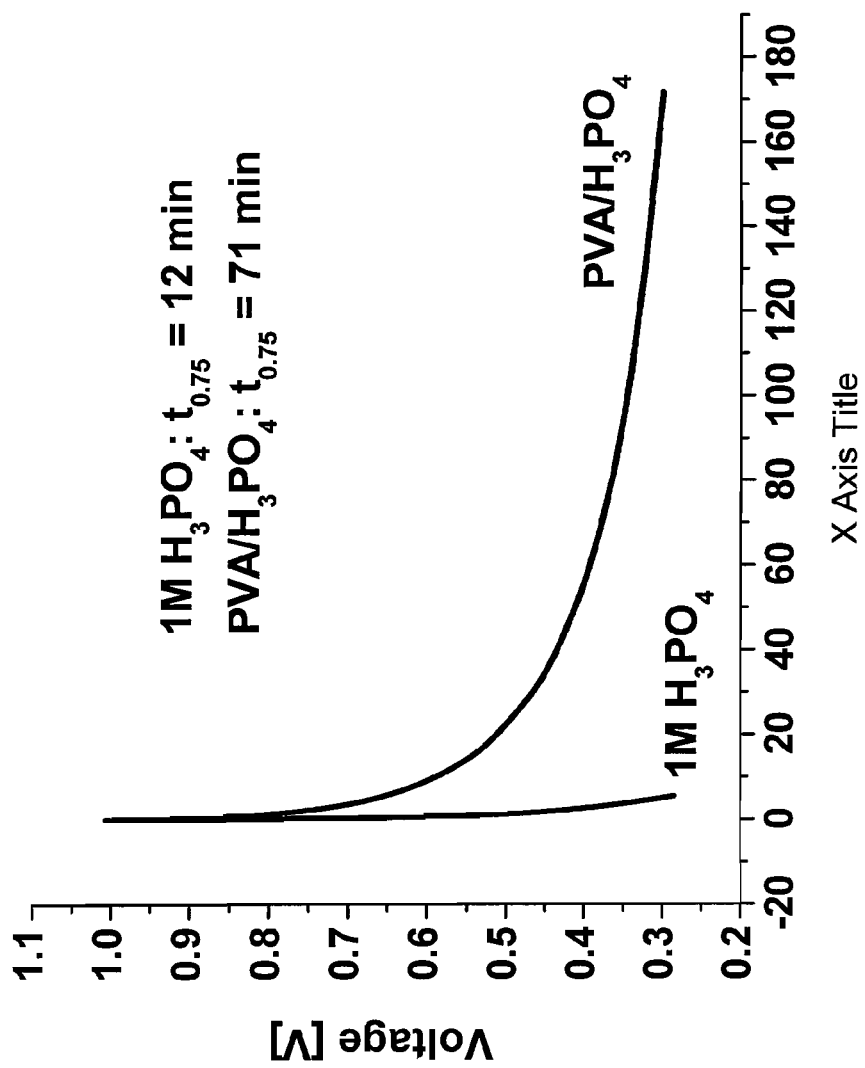

FIG. 27 shows self-discharge for CNT thin film supercapacitors using either 1M $H_3PO_4$ or a PVA/$H_3PO_4$-based polymer electrolyte according to an embodiment of the current invention. The $t_{0.75}$V-values indicate the time until the voltage has dropped below 0.75 V.

Figure 28:
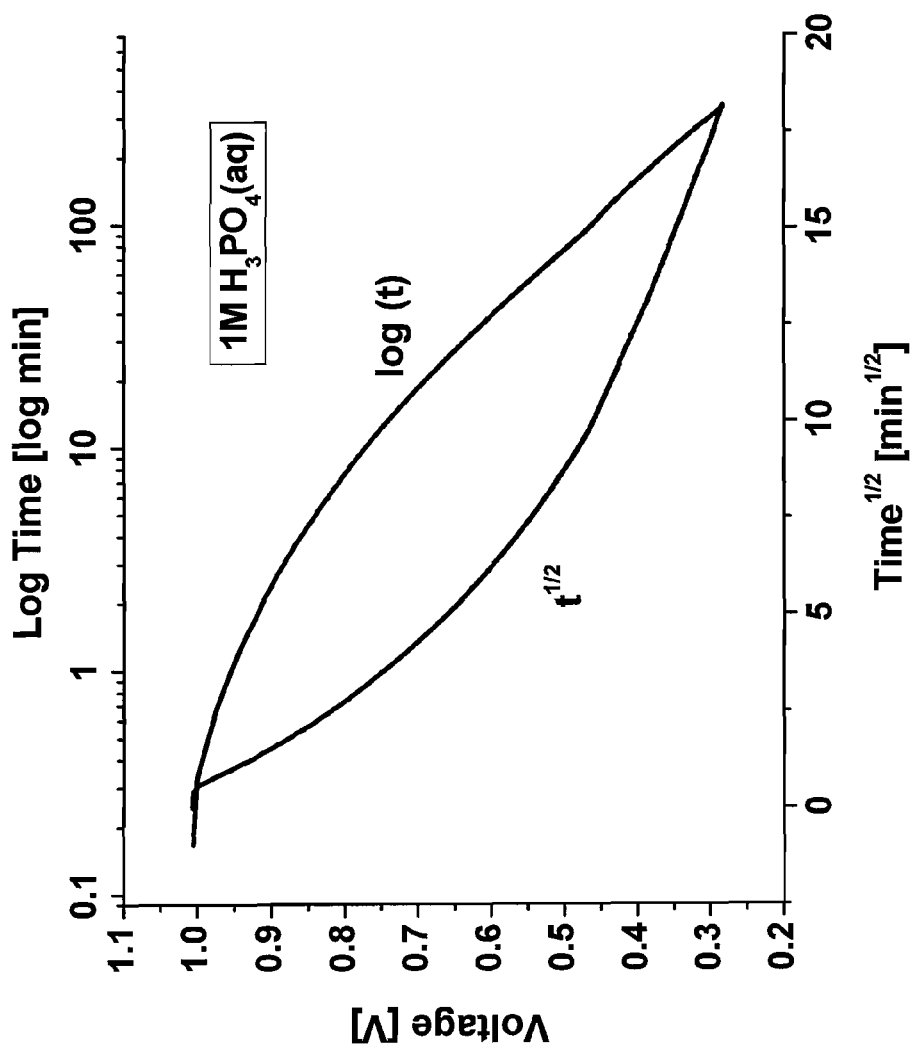

FIG. 28 shows time dependence of voltage during self-discharge for a CNT thin film supercapacitor in liquid 1M $H_3PO_4$ as electrolyte according to an embodiment of the current invention. The upper curve represents a V vs. log(t) plot (top axis) and the lower curve a V vs. $t^{1/2}$ plot (bottom axis).

Figure 29:
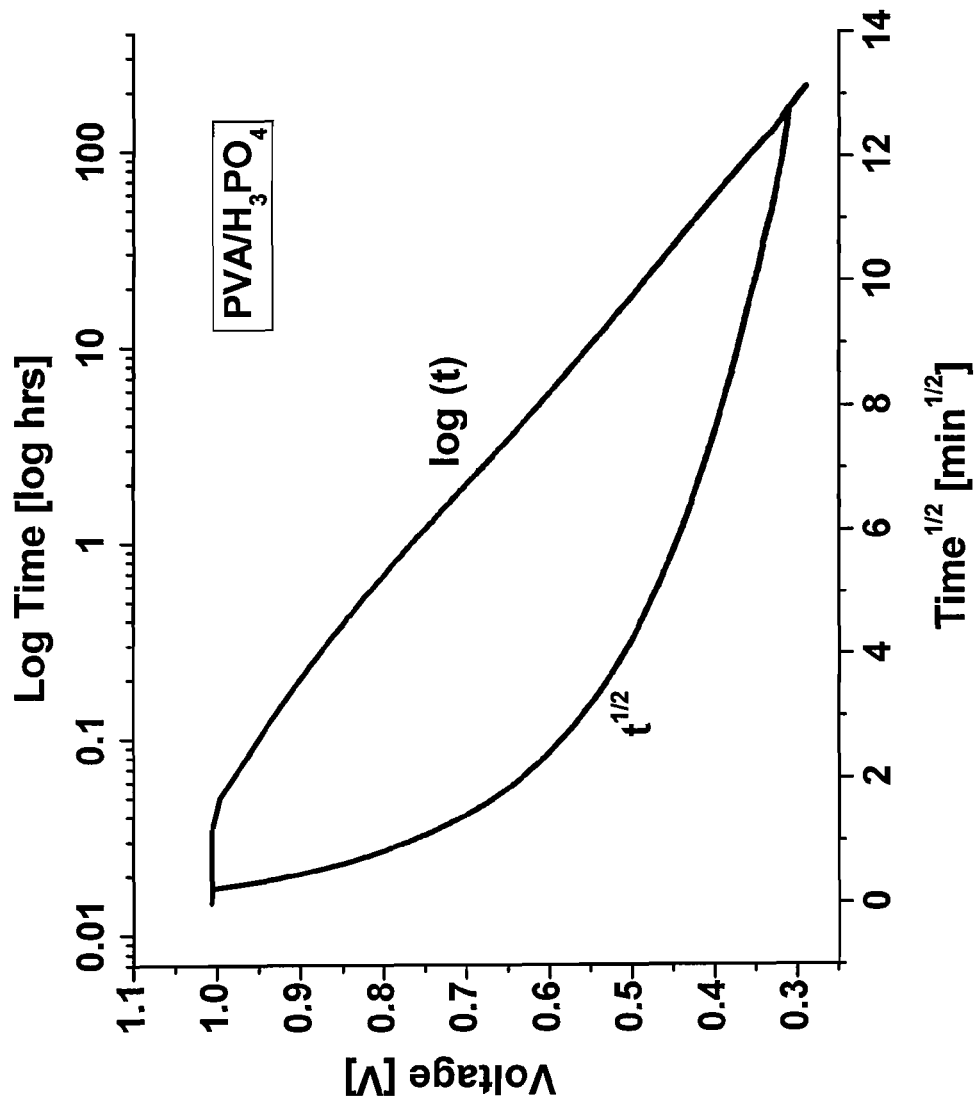

FIG. 29 shows time dependence of voltage during self-discharge for a CNT thin film supercapacitor using PVA/$H_3PO_4$ as electrolyte according to an embodiment of the current invention. The upper curve represents a V vs. log(t) plot (top axis) and the lower curve a V vs. $t^{1/2}$ plot (bottom axis).

Figure 30:
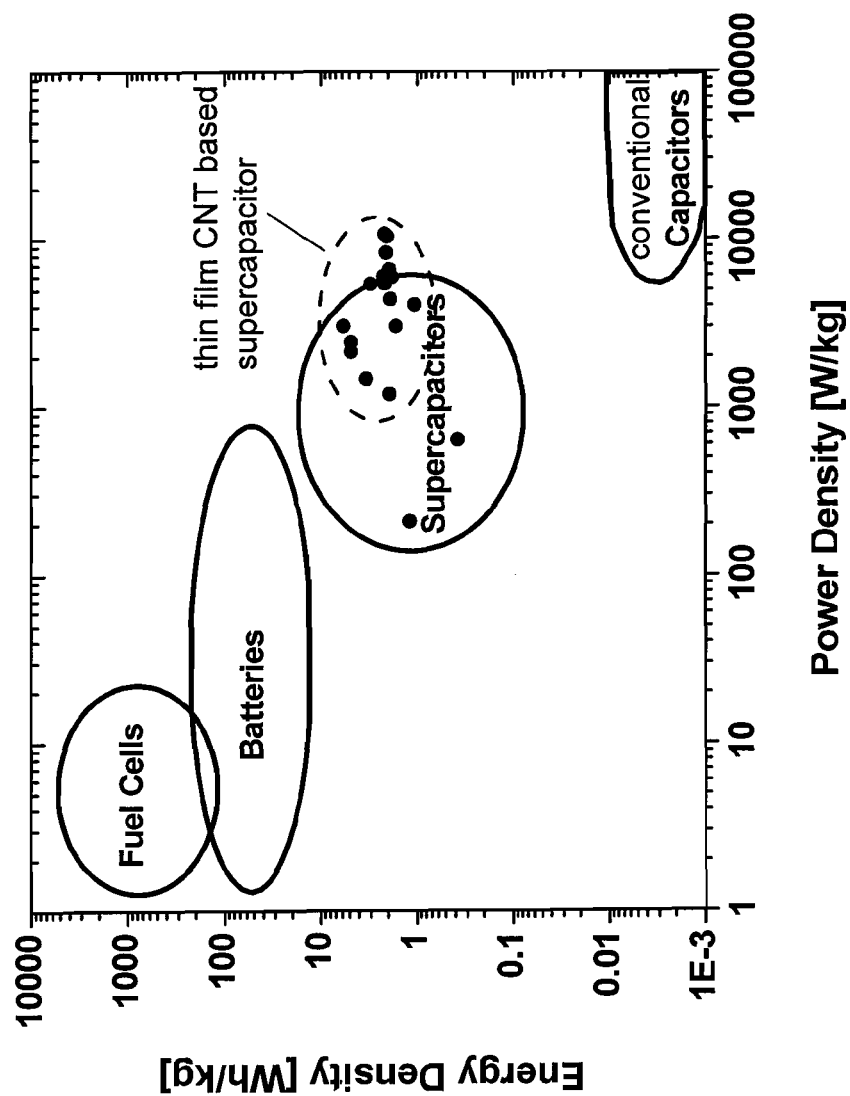

FIG. 30 shows a Ragone plot including thin film supercapacitors based on CNT networks (black dots) according to an embodiment of the current invention.

Figure 31:
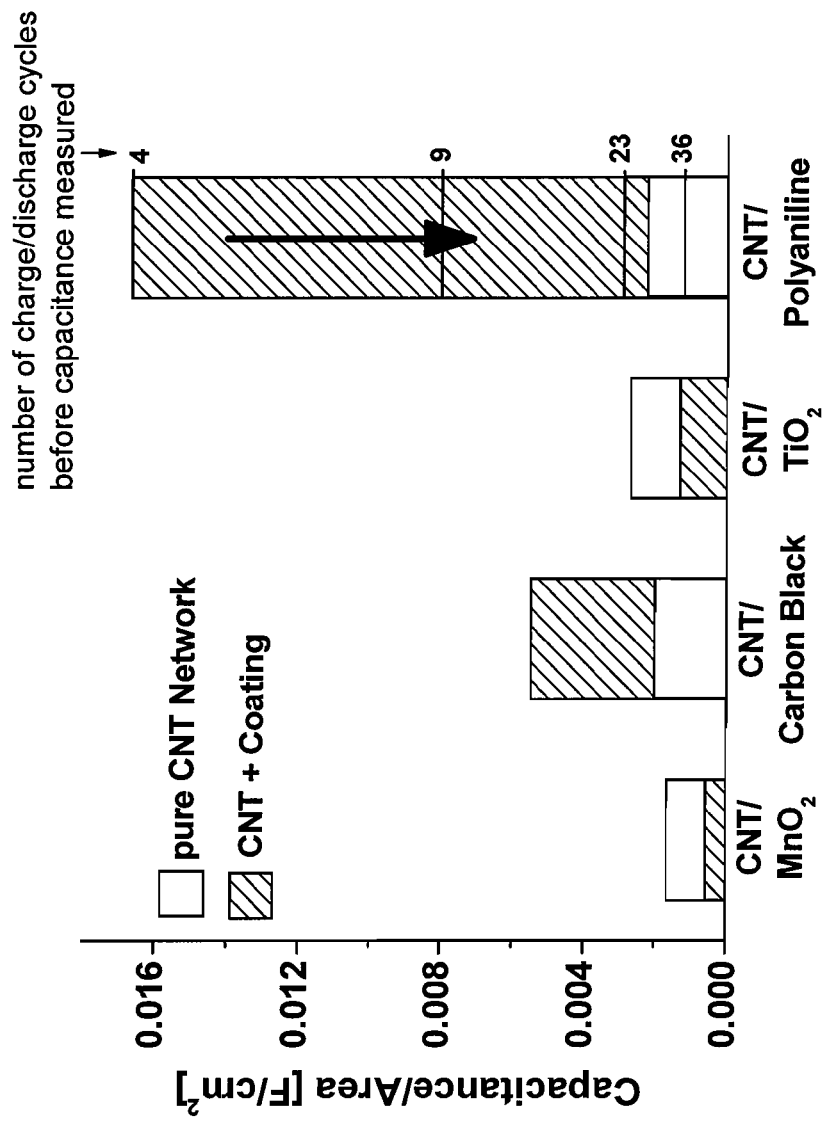

FIG. 31 shows capacitance/Area before and after spray-coating of an active material on top of the CNT network according to an embodiment of the current invention. The device was completed with a polymer electrolyte (PVA/$H_3PO_4$).

Figure 32:
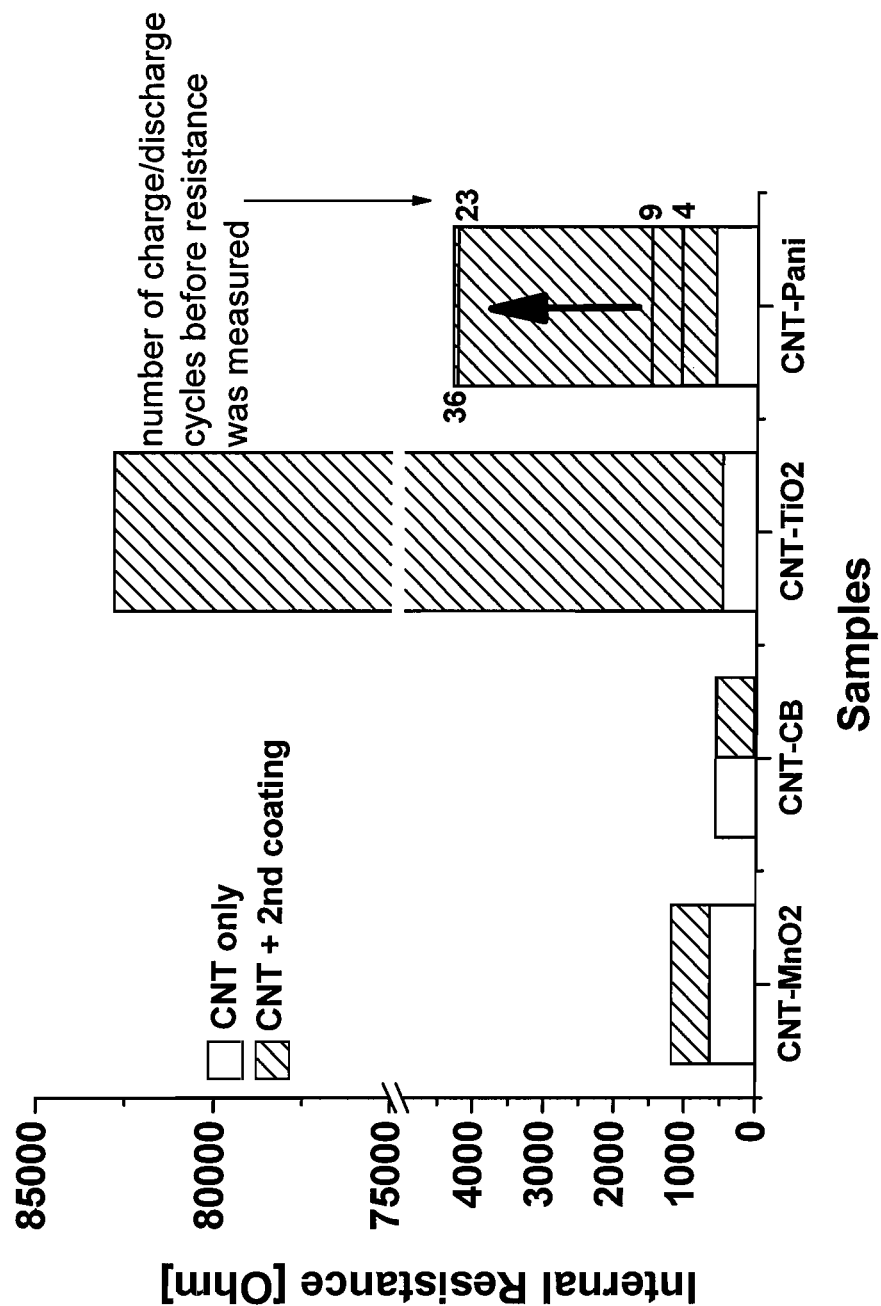

FIG. 32 shows internal resistance before and after spray-coating of an active material on top of the CNT network according to an embodiment of the current invention. The device was completed with a polymer electrolyte (PVA/$H_3PO_4$).

Figure 33:
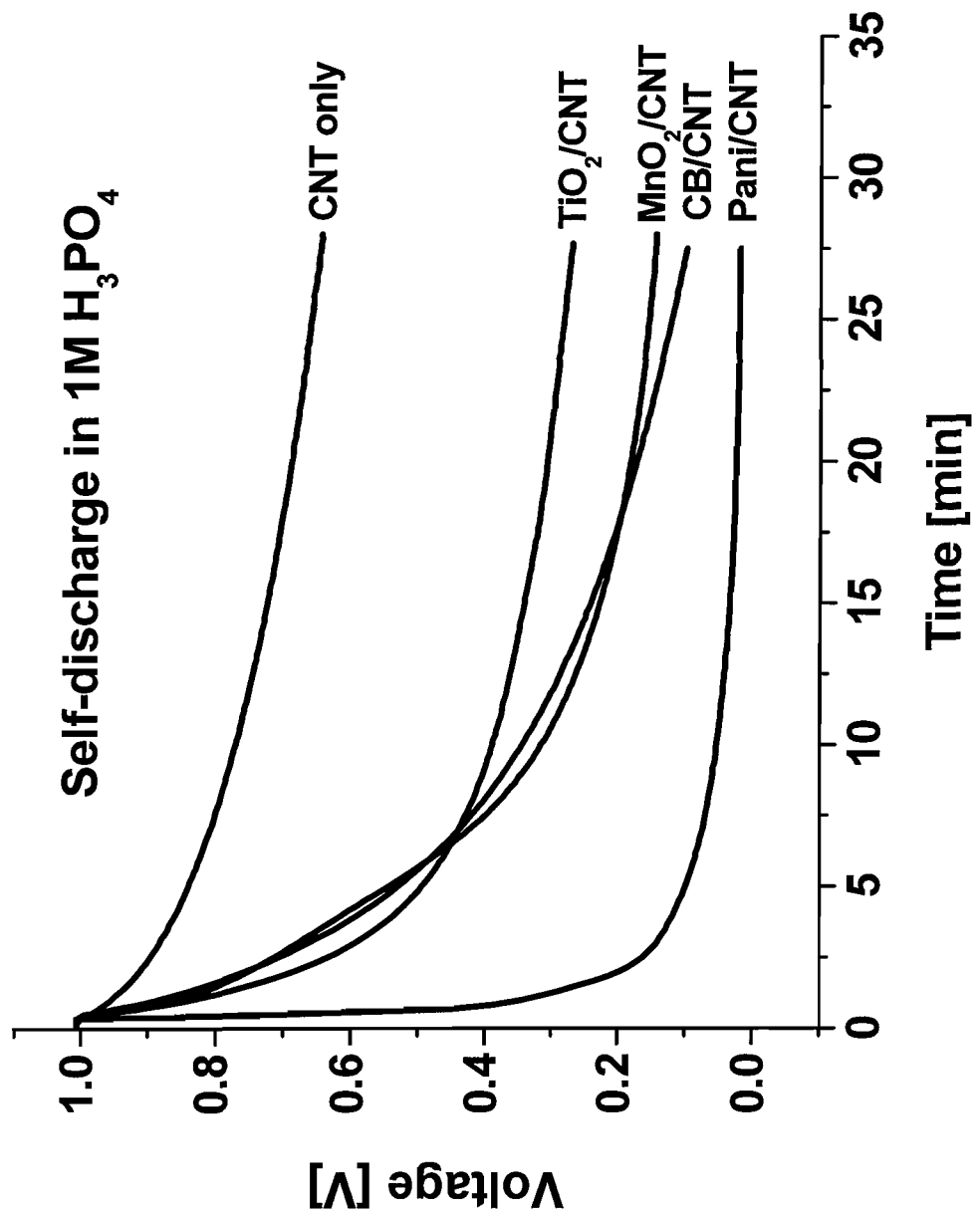

FIG. 33 shows self discharge of CNT based supercapacitors after 30 min charging to 1V in a liquid 1M $H_3PO_4$ solution.

Figure 34:
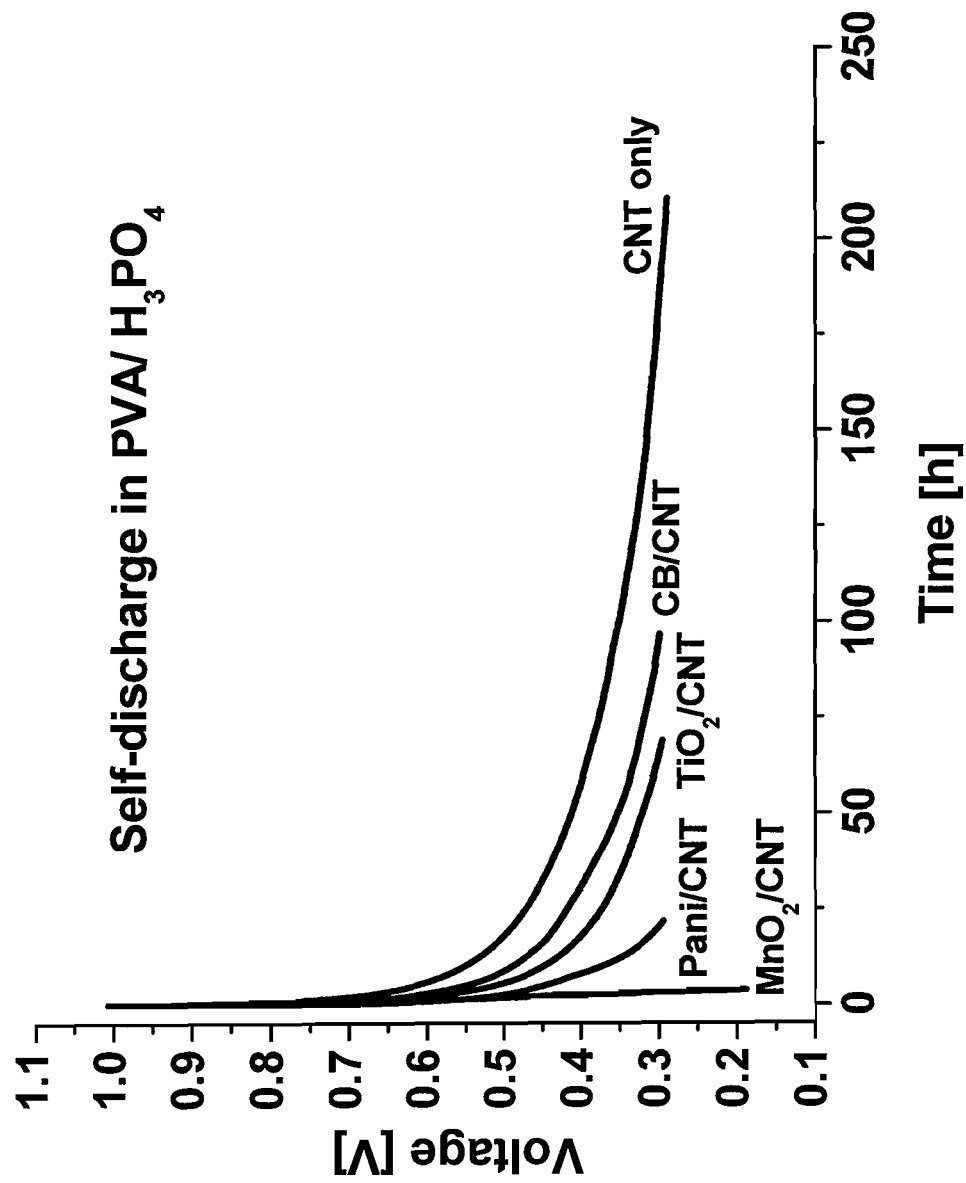

FIG. 34 shows self discharge of CNT based supercapacitors after 30 min charging to 1V in a polymer electrolyte according to an embodiment of the current invention. Note the different time scale.

Figure 35:
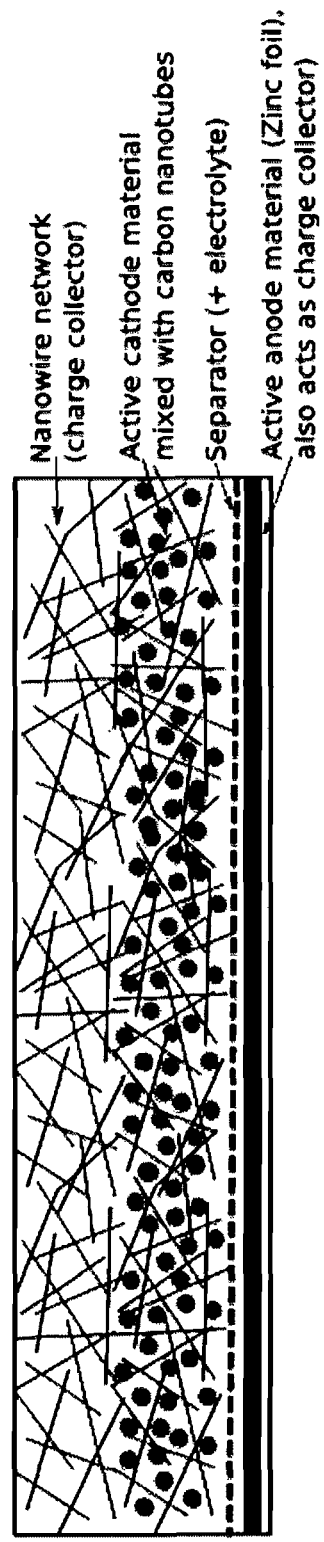

FIG. 35 shows a device featuring a carbon nanotube network as a charge collector and a manganese dioxide/carbon nanotube mix as an active electrode according to an embodiment of the current invention.

Figure 36:
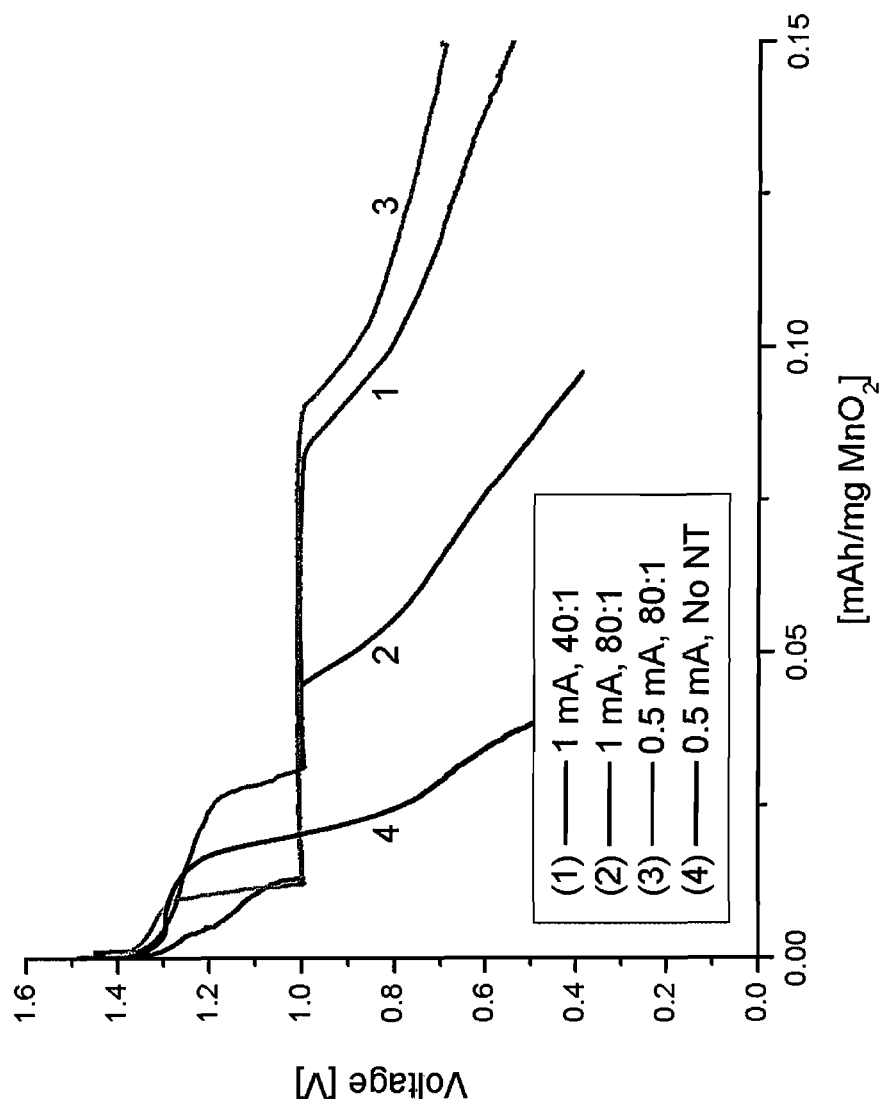

FIG. 36 shows typical discharge curves of devices as depicted in FIG. 35. The discharge was measured using various constant discharge currents (0.5 and 1 mA) and $MnO_2$ to nanotube ratios (40:1 and 80:1 and no nanotubes). Total capacity for these devices are 15 mA h (discharge 1 and 2) and 25 mA h (discharge 3) for a discharge to 0.8 V.

Figure 37:
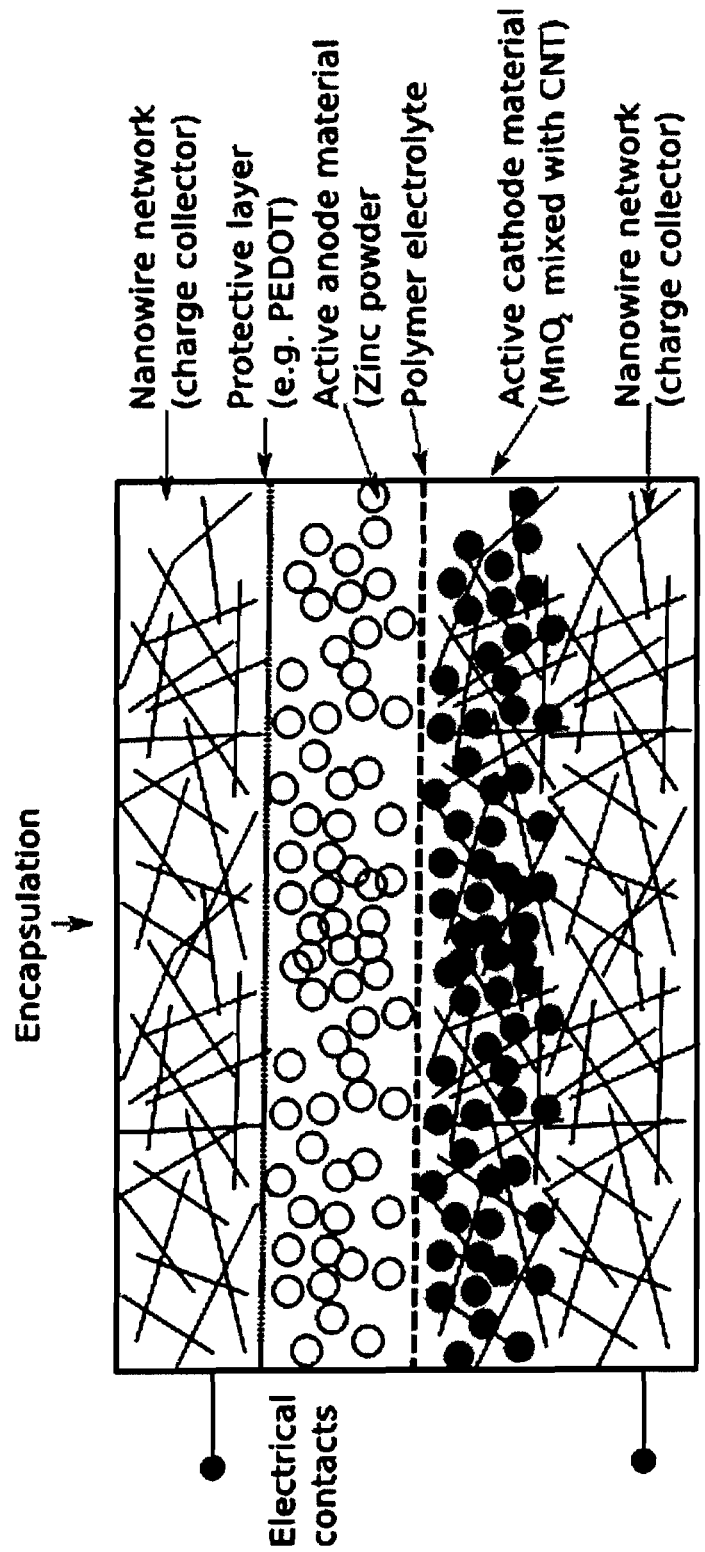

FIG. 37 is a schematic illustration of a fully printable and flexible battery using carbon nanotubes as a charge collector (protected by PEDOT on the Zinc side), Zinc powder (with electrolyte to create paste) as active cathode material, $MnO_2$/carbon nanotube (with electrolyte to create paste) mixture as active anode material and polymer electrolyte (electrolyte and PVA mixture) as separator according to an embodiment of the current invention.

Figure 38:
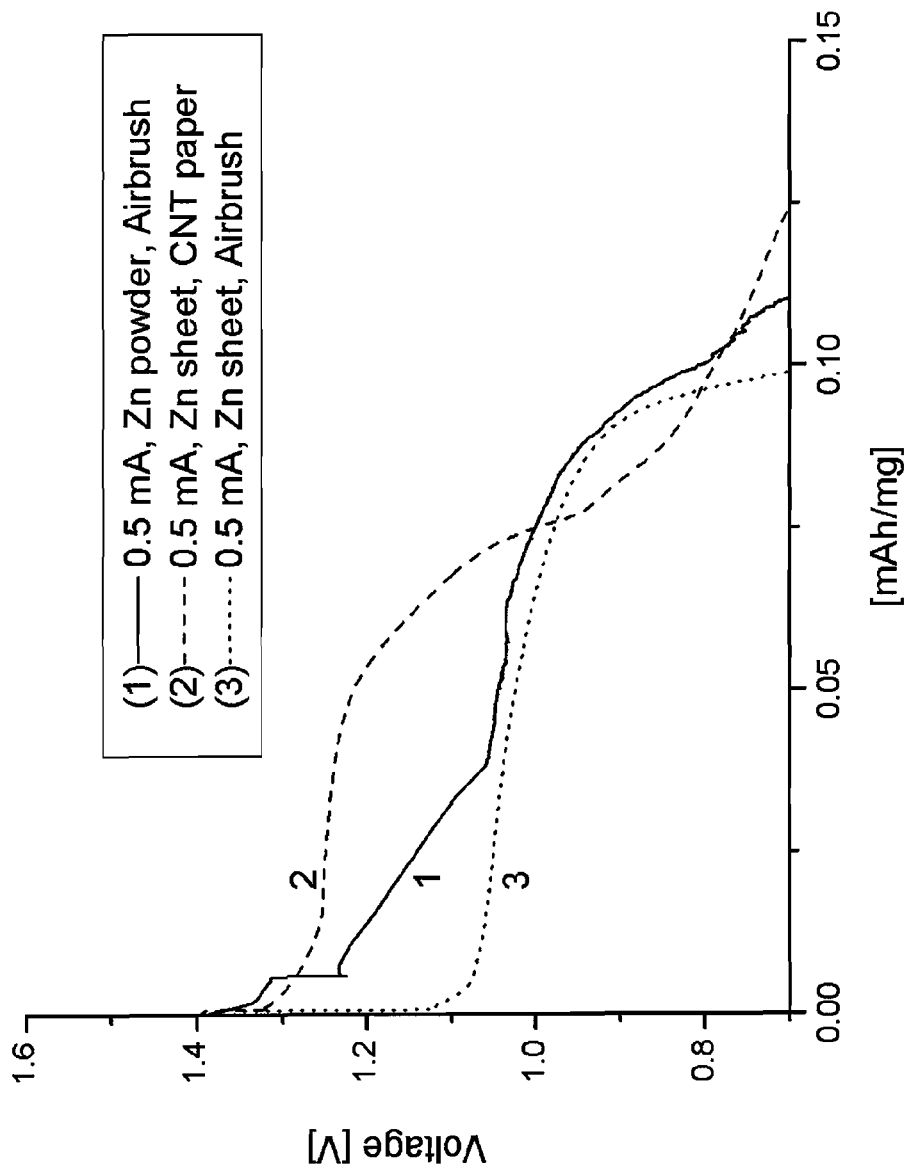

FIG. 38 shows a comparison of devices made with polymer electrolyte using Zn powder and Zn sheet electrodes on one hand and using the filtered CNT films (freestanding CNT paper) as well as the sprayed networks (airbrush) on the other. Mass efficiency is only 30-40% (as compared to up to 95% efficiency in the devices using liquid electrolyte) so far.

Figure 39:
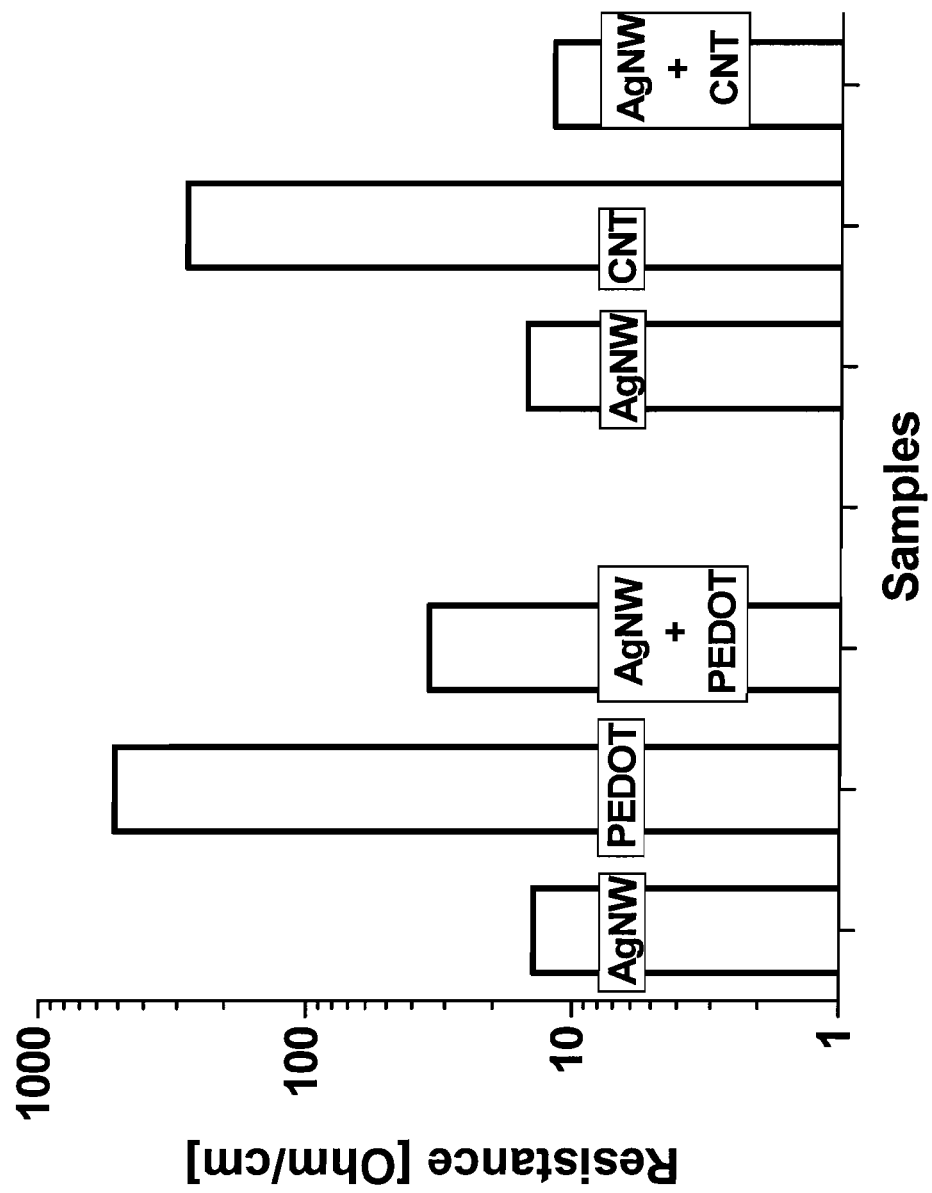

FIG. 39 shows resistance of Ag NW networks before and after being coated with either PEDOT or CNTs. For comparison, the resistance of the second coating only is also shown (center column per data set).

DETAILED DESCRIPTION OF THE INVENTION

In describing embodiments of the present invention illustrated in the drawings, specific terminology is employed for the sake of clarity. However, the invention is not intended to be limited to the specific terminology so selected. It is to be understood that each specific element includes all technical equivalents which operate in a similar manner to accomplish a similar purpose.

All references cited anywhere in this specification are hereby incorporated by reference herein. The term nanostructure is intended to have a broad meaning to include any structure that has at least one dimension less than about 100 nm and greater than about 1 nm and may include carbon nanotubes, fullerenes, nanowires of various materials including, but not limited to, polymers, nanoparticles, nanoplates and nanorods. A nanostructured network consists of nanostructured components, including but not limited to polymer nanofibers, inorganic nanoparticles, nanowires, and/or carbon flakes. The term "nanostructured network" is intended to refer to randomly and/or semi-randomly ordered nanostructures that are in electrical connection.

The term "active material" has a slightly different meaning in batteries versus supercapacitors. In a battery, the active material is the material which, through a chemical reaction (reduction/oxidation reaction) leads to the observed voltage and provides the electrical charges. The active material in a supercapacitor is the material that provides the high surface area for the double layer capacitance and undergoes the charge transfer reactions (pseudo capacitance).

The term "electrolyte" refers to the material which provides the ionic conductivity between the active materials.

Figure 1:
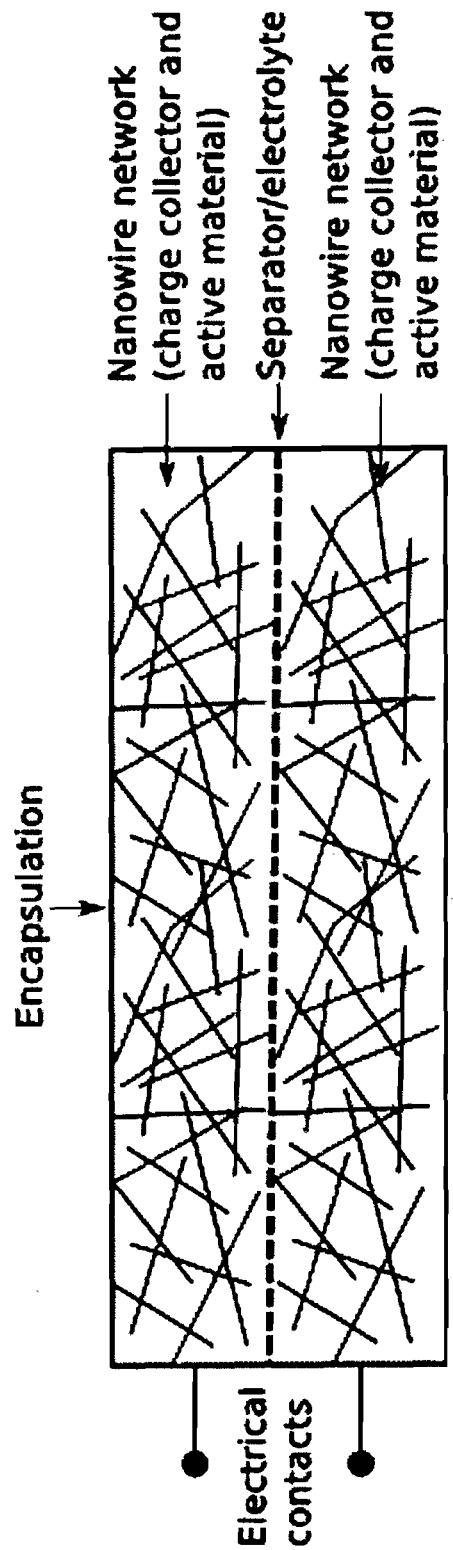
Figure 2:
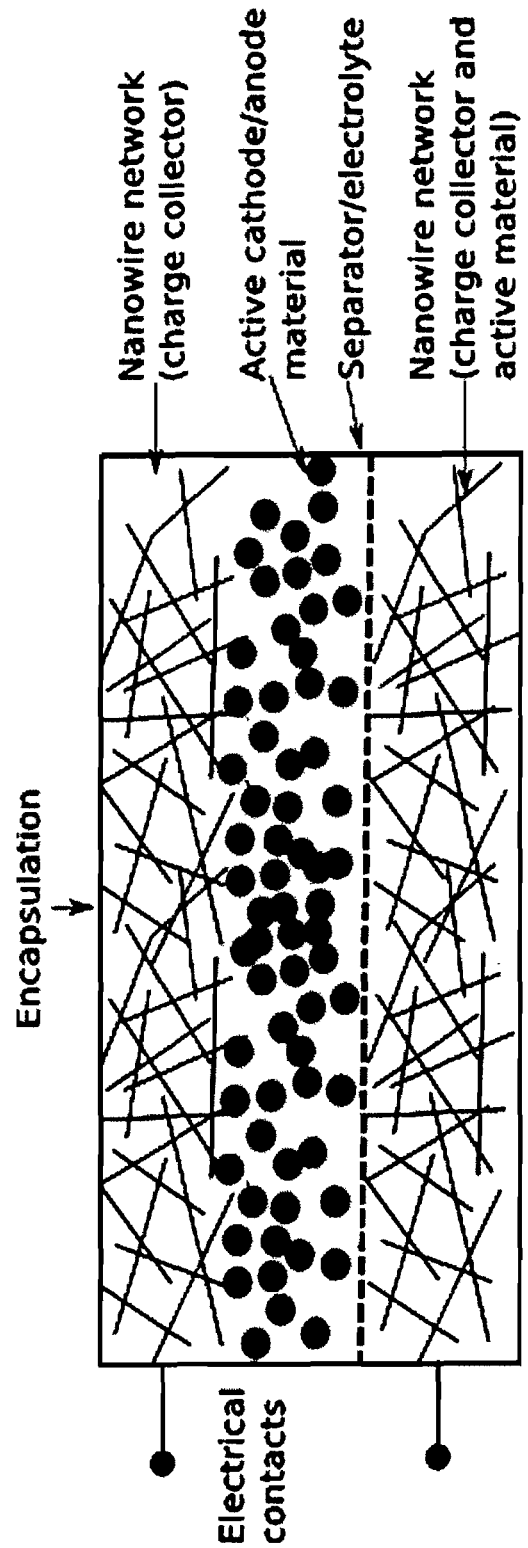
Figure 3:
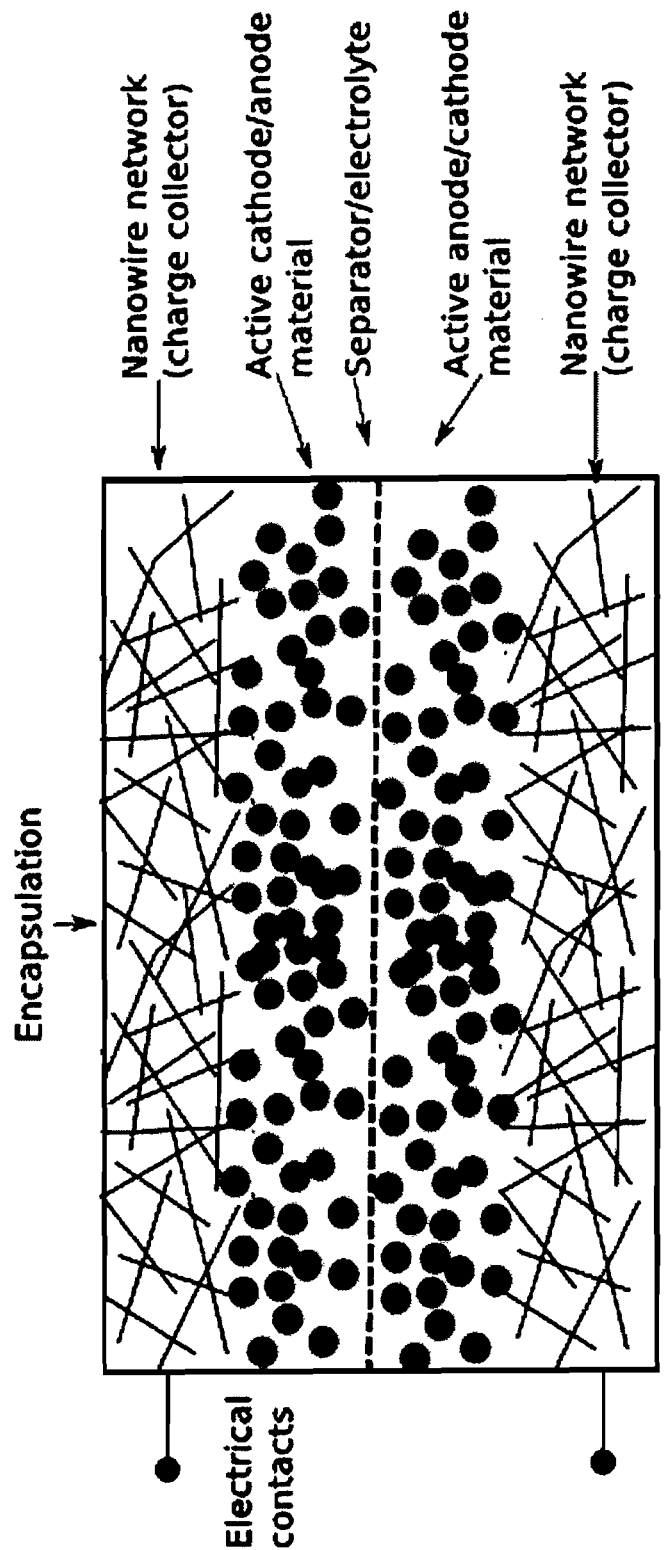
Figure 4:
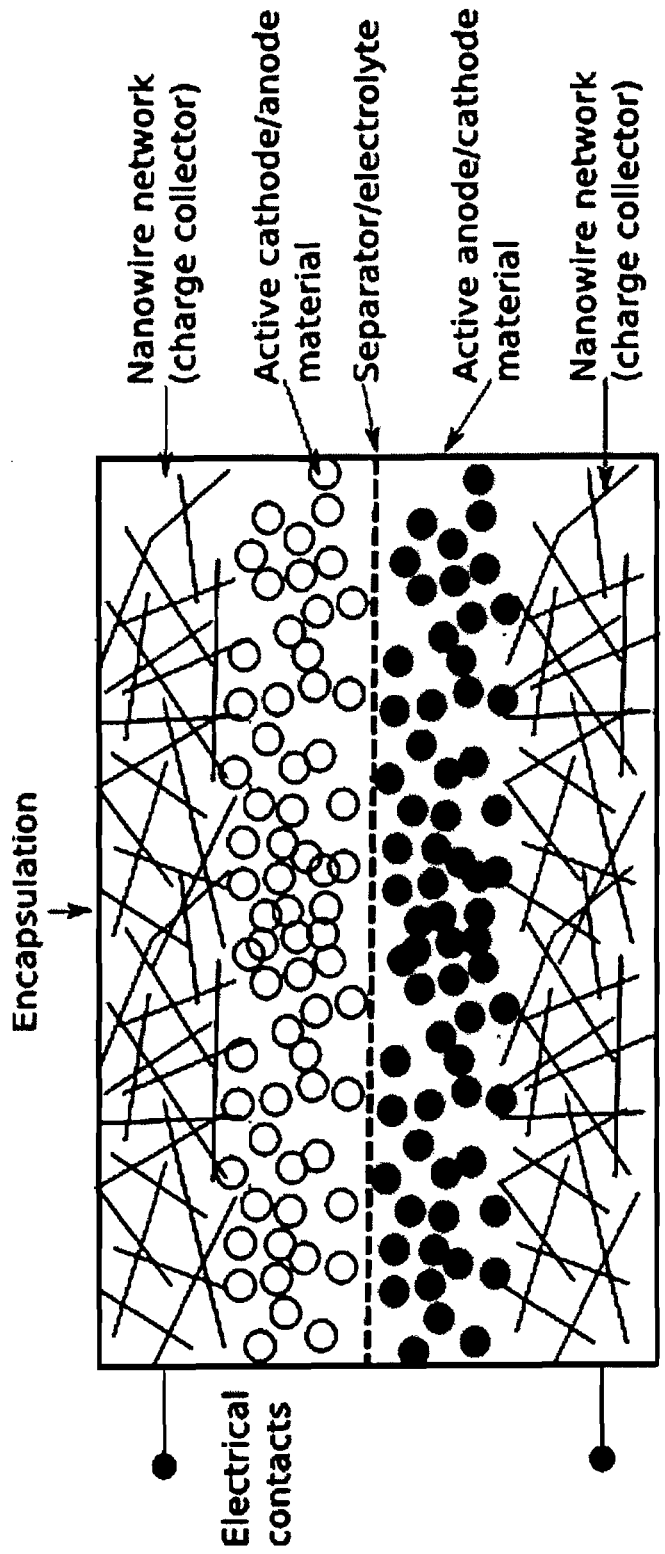
Figure 5:
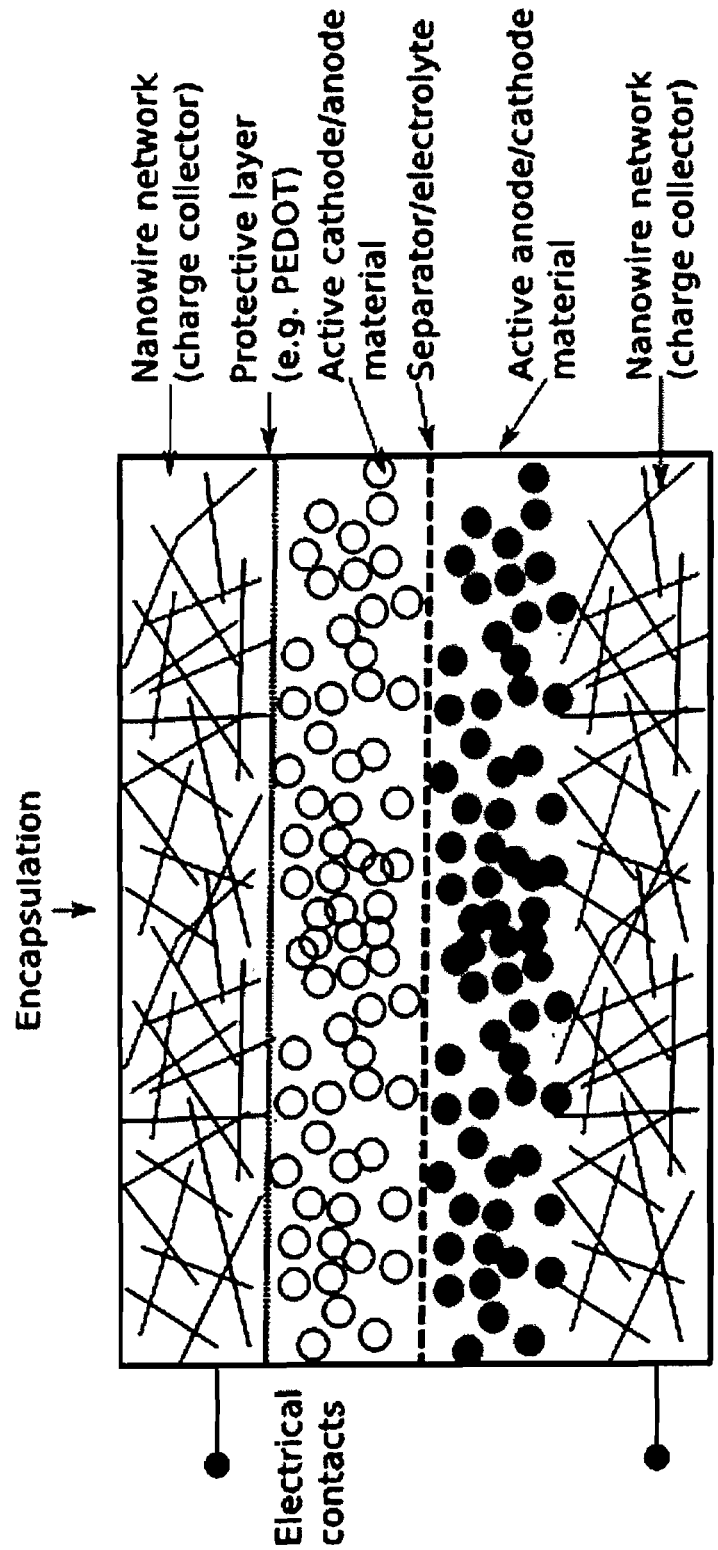
Figure 6:
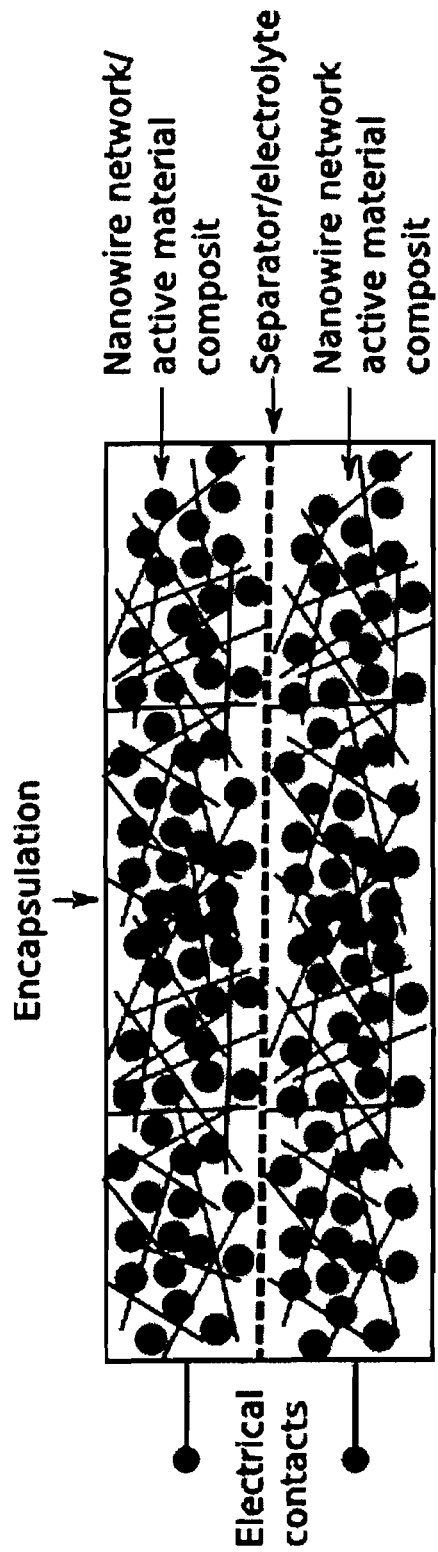
FIG. 6 is a schematic illustration of a symmetric energy storage device utilizing composite electrodes (nanowires or nanotubes network mixed with another material) according to an embodiment of the current invention. The configuration shown represents a symmetric supercapacitor.
Figure 7:
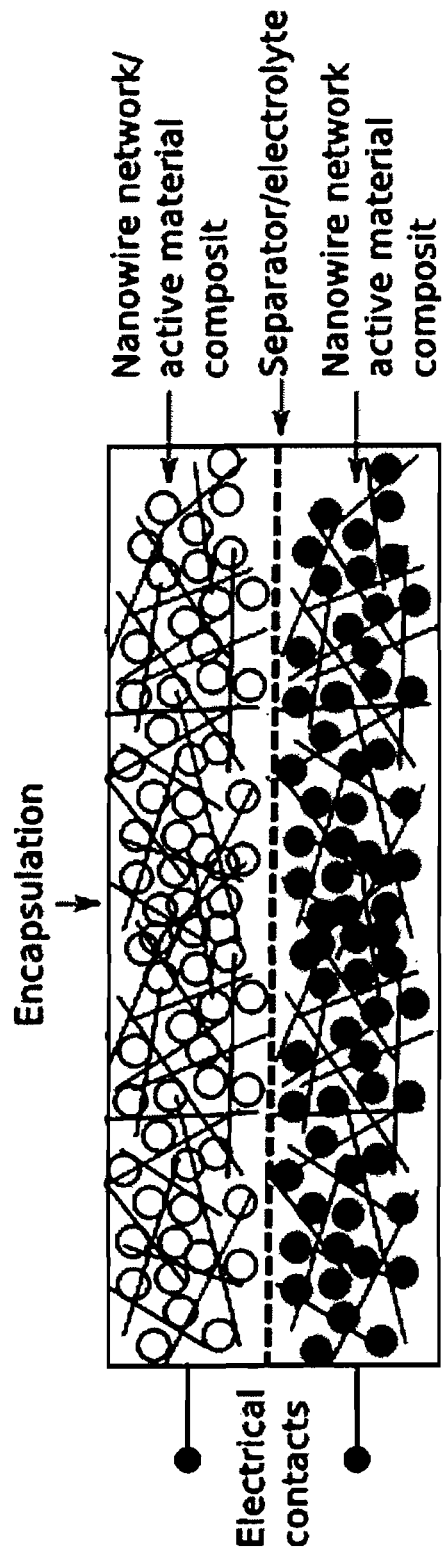
FIG. 7 is a schematic illustration of an asymmetric energy storage device utilizing composite electrodes (nanowires or nanotubes network mixed with another material that is different for both sides) according to an embodiment of the current invention. The configuration shown represents an asymmetric supercapacitor or a battery.

Carbon nanotubes are highly conducting nano-scale wires that can form thin films with low sheet resistance. Such films (G. Gruner et al, J. Mater. Chem. 16, 3533 (2006)) are used for a variety of electronic and sensing (G. Gruner et al, Nano Lett. 6, 2031 (2006)) applications. The present invention can exploit not only the low resistance but also the high surface area of the film. FIG. 1 is a schematic illustration of a supercapacitor that incorporates carbon nanotube films. The CNT films act as the electrode, in intimate contact with the electrolyte, and also serve as the charge collector. In an embodiment of the current invention, two CNT films are used, i.e., for both electrodes and charge collectors. In other embodiments of this invention, other types of nanostructured films may be used in place of the CNT films, or in combination with such films.

It is an object according to some embodiments of the present invention to provide a nanostructure-film device for charge storage devices. Specifically, a supercapacitor and a battery device with nanostructure-film as both the electrode and charge collector is provided according to some embodiments of the current invention. Nanostructure-films include, but are not limited to, carbon nanotubes, graphene flakes and silver nanowires.

In accordance with one embodiment of the present invention, a supercapacitor device and a battery device comprising carbon nanotube (CNT) films is provided. Conducting films composed of randomly distributed CNTs have been demonstrated as having better electrical properties than carbon black. Moreover, carbon is one of the most abundant elements on Earth.

The above embodiment may be a supercapacitor device, comprising at least one carbon nanotube film on a substrate, a separator and a conducting liquid. In another embodiment, a battery comprising at least one carbon nanotube film on a substrate, a separator and a conducting liquid. Electrical contact pads may also be connected, and the nanostructure-film conducting layer(s) may be patterned (e.g., with photo lithography and reactive ion etching (RIE)).

A method for fabricating the above-mentioned device embodiments is also described. The method comprises forming a free standing nanotube film, or depositing a nanostructure-film on a substrate, and subsequently forming the devices. The method may further comprise depositing and patterning the aforementioned electrical contact pads.

EXAMPLE 1

Fabrication of Supercapacitor with Free Standing Carbon Nanotube Films 1.1 Preparation of Carbon Nanotube (CNT) Suspension 1.1.1 CNT material is suspended in an aqueous or organic liquid, using a surfactant if necessary. Ultrasound is used to give a stable and homogeneous suspension in a reasonable time.

1.1.2. The CNT suspension is filtered through a membrane filter (pore size 0.1-0.01 μm) using a standard flask, a frit as filter holder and a moderate vacuum to suck through the suspension (see FIG. 17).

1.1.3 The filter cake is an entangled network of CNTs. It can be peeled off from the filter to give a freestanding CNT network which can be used as an electrode in devices according to some embodiments of this invention.

1.2 Preparation of the Capacitor 1.2.1 The freestanding CNT network is glued on a substrate and electrically contacted in this example. For the substrates, plastics have been found to work well but glass, fabrics or other material can be used as well. Regarding the glue, double sided scotch tape works as well as any liquid glue such as epoxy. For the electrical contacts, alligator clips can be directly clipped to one end of the CNT electrode. Also, silver paste or evaporated/sputtered metals such as gold can be used to draw a conductor path to the CNT electrode. In order to increase the performance, a conducting polymer was deposited on top of the CNT network (multiple layers).

1.2.2 Two CNT electrodes prepared such as described in 1.1, were wetted with the electrolyte used. Then, they were stacked on top of each other using a porous membrane as separator (see FIG. 18). The electrolyte can be based on organic or aqueous solutions as well as on ionic liquids. Such electrolytes can be immobilized in a polymer or gel leading to so-called polymer or gel electrolytes. Usually, the use of such polymer or gel electrolytes makes an extra separator unnecessary.

1.3 Test Results

Two methods are used in the following evaluation of CNT electrodes in supercapacitors: cyclic voltammetry and galvanostatic charge/discharge.

Our preliminary results prove that CNT networks can indeed be used as electrodes in supercapacitors. The results (30-80 F/g) are comparable to other supercapacitors using CNT as electrode material in composites (CNT material mixed with amorphous carbon and optionally a binder). FIG. 19 is an SEM image showing the structure of the CNT network and the graphs in FIGS. 20 and 21 are showing a galvanostatic charge/discharge and cyclovoltammograms, respectively. In this device, CNT networks are used as the sole electrode material. A commercial membrane filter acts as separator, and polyethylene therephthalate (PET, overhead transparency) is used for both, a substrate and container for the electrolyte, as depicted in the photograph in FIG. 23.

The larger area within the curve when coated with polyaniline, as shown in FIG. 22, proves that a higher capacitance can be achieved by deposition of a suitable active material and thus leads to higher energy density ($E=\frac{1}{2}CV^2$).

EXAMPLE 2

Supercapacitor with NT Electrode and Charge Collector on a Substrate 2.1 Preparation of the Capacitor Single wall carbon nanotube (SWCNT) material was dissolved in pure water (1-2 mg/ml) with the aid of a tip sonicator. Using an air brush pistol the stable suspension was sprayed onto overhead transparencies (polyethylene-therephthalate, PET) which were placed on a heating plate at ~100° C. During spraying, the water evaporates and the CNTs form an entangled random network on the PET. Afterwards the CNT coated PET substrates were used as thin film electrodes without any further treatment. The polymer electrolyte was prepared by mixing polyvinyl alcohol (PVA) with water (1 g PVA/10 ml $H_2O$) and subsequent heating under stirring to ~90° C. until the solution becomes clear. After cooling down, concentrated phosphoric acid was added (0.8 g) and the viscose solution was stirred thoroughly. Finally, the clear solution was cast into a Petri dish where it was left to let excess water evaporate. Once the polymer electrolyte ($H_3PO_4$/PVA) is hard, it was cut into pieces serving as both electrolyte and separator in our devices. The $H_3PO_4$/PVA was relatively thick (~1.2 mm) but can be easily decreased by changing the PVA/Water ratio and by using printing techniques. Liquid electrolytes of 1M solutions of $H_3PO_4$, $H_2SO_4$, and NaCl were prepared for comparison. For the device assembly, the CNT coated PET substrates were sandwiched together separated by a piece of polymer electrolyte. Galvanostatic charge/discharge experiments have been used to evaluate the capacitance of such devices using a potentiostat in a 2-electrode configuration.

2.2 Test Results 2.2.1 Capacitance of Thin Film CNT Electrodes in Liquid and Polymer Electrolytes We compared the H3PO4/PVA-polymer electrolyte with different liquid electrolytes (1M solutions of H3PO4, H2SO4 and NaCl) in terms of the specific capacitance of our device. In FIG. 24, a typical galvanostatic charge/discharge curve of our devices is shown which looks very similar in all electrolytes investigated. The specific capacitances C have been calculated from such curves using $C=I/\Delta E$, where I is the current applied and $\Delta E$ the voltage range. Also, the internal resistances (IR) of the devices have been evaluated from the voltage drop at the beginning of each branch of the curve.

The evaluated specific capacitances when different electrolytes were used are summarized in FIG. 25.

When strong acids ($H_3PO_4$, $H_2SO_4$) are used the specific capacitance is slightly higher compared to the polymer electrolyte, about 10%. This can be explained by the fact that both the amount of electrolyte per volume and the mobility of the ions are somewhat reduced compared to a fully liquid electrolyte. The internal resistances of our devices were typically between 500Ω and 600Ω and did not vary significantly with the electrolytes investigated. The relative high resistance is mainly due to the thick polymer electrolyte. In general, the specific capacitances of our thin film devices were about 60

F/g which is comparable to conventional devices using amorphous carbon (a-C) electrodes and liquid electrolytes.

2.2.2 Optimization of Thickness

The thickness of the thin film CNT electrode is another issue to be optimized. In general, thicker electrodes provide a higher capacitance assuming that all material is in contact with the electrolyte. However, in devices, in particular in thin printed devices, the amount of liquid is limited which also limits the penetration depth of the electrolyte into the porous electrode material. In general, only the part of the electrode material which is wetted by the electrolyte contributes to the capacitance leading to an effective thickness ($d_{eff}$) of the electrode. Excess electrode material should be avoided as it decreases the device performance when correlated to its mass. This makes thin film electrodes potentially more effective than thick electrodes, and printing techniques can take advantage of that as they are limited to rather thin films too. In FIG. 26, the dependence of the capacitance from the electrode thickness is presented for both a liquid ($H_2SO_4$) and two polymer electrolytes (PVA/$H_3PO_4$) with different PVA-electrolyte ratios.

For thin electrodes (d<1 μm) the capacitance increases linearly with the thickness regardless of the electrolyte used. This confirms the results presented in FIG. 25 showing that the capacitance is almost independent from the type of electrolyte. For thicker electrodes, however, the situation is different. Whereas the capacitance still increases linearly for the liquid electrolyte, it shows saturation when a polymer electrolyte is used. This observation leads to the conclusion that the polymer electrolyte does not entirely penetrate into the porous network provided leading to an effective thickness ($d_{eff}$) which is specific for the electrode/electrolyte configuration used. In contrast, the liquid electrolyte penetrates through the entire thickness of the CNT electrodes leading to a maximum wetting of the electrode and maximum performance. The difference of $d_{eff}$ for liquid and polymer electrolytes can be explained by a different amount and mobility of the electrolyte. The disadvantage of a lower absolute capacitance of thin film CNT electrodes can easily be compensated by simply printing more layers. In certain embodiments of the present invention, the network density of thin film electrode layers can be varied to provide differing properties. For example, a current collector portion of the electrode may be formed from a relatively denser CNT network (e.g., providing higher electrical conductivity), while a portion of the electrode that is in contact with the electrolyte may be formed from a relatively less dense CNT network (e.g., allowing for better electrolyte penetration into the network, and correspondingly higher capacitance). Such an electrode may be fabricated by, for example, forming a first layer by depositing a solution (e.g., as described above) having a relatively high concentration of CNTs onto a substrate, and subsequently depositing another solution having a relatively lower concentration of CNTs over the first layer to form a second layer (e.g., with a lower CNT network density).

2.2.3 Self-Discharge

Self-discharge refers to the gradual decrease of the voltage across the supercapacitor when charged and left unconnected. In the absence of leakage current, self-discharge is mainly due to faradaic reactions of impurities, including oxygen species, which can be either activation controlled or diffusion controlled.

In practice, both mechanisms are observed and the dominating mechanism depends often on the voltage applied. Important for practical considerations is the time until the voltage has dropped below 0.75V assuming that energy cannot conveniently be extracted from a capacitor at voltages less than 0.75V. In FIG. 27, a liquid and a polymer electrolyte are compared in terms of the self-discharge of a CNT thin film supercapacitor.

It is obvious that the polymer electrolyte decreases the self-discharge rate significantly. Its use clearly improved the shelf-life of a CNT thin film supercapacitor which remained operable for about 1 h when put in the charged state. This can be explained by a significant influence of the polymer electrolyte on the self-discharge mechanism. According to Conway et al. the principal mechanisms of self-discharge can be distinguished by the form of the decline of voltage V in time. If the dominating mechanism is activation controlled, a linear dependence of V from log(t) can be observed. If it is diffusion controlled, the voltage depends linearly from $t^{1/2}$. This gives an easy diagnostic tool and allows identifying the dominating mechanism simply by plotting the voltage vs. either log(t) or $t^{1/2}$. In FIGS. 28 and 29, such an analysis is presented for the self-discharge of CNT-thin film supercapacitor using either a liquid (1M $H_3PO_4$) or a polymer electrolyte (PVA/$H_3PO_4$).

When a liquid electrolyte is used (FIG. 28) a clear linear decline of the voltage cannot be observed for either the V vs. $t^{1/2}$ plot or the V vs. log(t) plot. This indicates that a clear distinction between both mechanisms is not possible for this case and both activation and diffusion controlled self-discharge takes place in parallel.

When a polymer electrolyte is used (FIG. 29), however, the situation has changed. Whereas the V vs. $t^{1/2}$ plot, again, does not give a linear dependence at all a pretty straight line over the entire voltage regime investigated can be observed for the V vs. log(t) plot. This leads to the conclusion that the self-discharge is dominated by an activation controlled mechanism when a polymer electrolyte is used. Obviously, the diffusion controlled mechanism became negligible which can be explained by the limited mobility of ions as they are trapped in the polymer matrix. Hence, the self-discharge rate is, though not eliminated, at least slowed down significantly making the use of a polymer electrolyte favorable over a liquid electrolyte.

Energy and Power Density

The energy density vs. power density plot, also called Ragone Plot, allows the comparison of various charge storage devices in terms of their performance. In FIG. 30, such a Ragone Plot summarizes the performance of CNT-based thin film supercapacitor in comparison with fuel cells, batteries and conventional capacitors and supercapacitors.

Even though our devices are not yet optimized in these examples, their performance already approaches the higher limit of conventional supercapacitors. This is not surprising as CNT networks provide a significant weight-advantage since a heavy metallic current collector is completely unnecessary. Also, the entire CNT network contributes to the double layer and no excess material is left maximizing the efficiency of thin film CNT supercapacitors. The combination of the current collector and the active layer in a single thin film results in the very good performance observed in the Ragone plot. Optimizations towards a higher energy and power density might lead to a point where the performances of thin film CNT supercapacitors even exceed the typical range of conventional devices (black circle). Such optimizations may include organic polymer electrolytes for a higher operating voltage and thin top-coatings of other materials for additional pseudo capacitive contributions.

2.3 Electrolytes

In the embodiment described above one representative electrolyte has been used. Any compound is suitable as electrolyte in supercapacitors when its components can be used as mobile ionic species. In order to achieve that requirement, mostly salts are dissolved in a solvent, but salts liquid at room temperature (ionic liquids) are also possible. The most common systems to achieve that are listed below.

2.3.1 Aqueous Electrolytes

Usually, inorganic acids, bases and salts are dissolved leading to ionic species. For high conductivities, however, solutions of strong acids or bases are usually favored. Examples are given below:

2.3.1.1 Strong Acids: $H_2SO_4$ (aq), $H_3PO_4$ (aq), . . .

2.3.1.2 Strong Bases: KOH, NaOH, . . .

2.3.1.3 Moderate pH: Solutions of any compound which dissolves into ionic species, such as salts like $NaSO_4$, $K_2SO_4$, LiCl, . . .

2.3.2 Organic Electrolytes, Consisting of a Solvent and an Electrolyte Dissolved in the Solvent. Examples are given below.

2.3.2.1 Solvents:

Ethylene Carbonate (EC), Dimethyl Carbonate (DMC), Propylene Carbonate (PC),

Diethyl Carbonate (DEC), Ethyl Methyl Carbonate (EMC), Dimethylformamide (DMF), Tetrahydrofuran (THF), γButyrolactone, 1,3-Dioxolane (DOL), Methylacetate (MA), Glutaronitrile (GLN), . . .

2.3.2.2 Electrolytes:

$Et_4NClO_4$, $Et_4NBF_4$, $Et_4NPF_6$, $Et_4NAsF_6$, $Et_4NSbF_6$, $Et_4NNbF_6$, $Et_4NCF_3SO_3$, $Et_4NC_4F_9SO_3$, $Et_4N(CF_3SO_2)_2N$, $Et_4NBCH_3(C_2H_5)_3$, $Et_4NB(C_2H_5)_4$, $Et_4NB(C_4H_9)_4$, $Et_4NB(C_6H_5)_4$, $Et_4NB(C_6F_5)_4$, $LiCF_3(SO_3)$, $LiN(CF_3SO_2)_2$, $LiClO_4$, $LiAsF_6$, $LiBF_4$, $LiPF_6$, . . .

2.3.3 Ionic Liquids

Room temperature ionic liquids are usually quaternary ammonium salts, such as tetralkylammonium $[R_4N]^+$, or based on cyclic amines, both aromatic (pyridinium, imidazolium) and saturated (piperidinium, pyrrolidinium). Low-temperature molten salts based on sulfonium $[R_3S]^+$ as well as phosphonium $[R_4P]^+$ cations are also known. Cations may be modified by incorporating functionalities to carbon atoms of the ring: for example incorporating nitrile to 1-alkyl-3-methylimidazolium. As well, anions may be based on cyano groups, such as $[Ag(CN)_2]^-$, $[C(CN)_3]^-$ or $[N(CN)_2]^-$. Examples are given below.

2.3.3.1 Imidazolium Based $[MeMeIm]^+[N(CF_3SO_2)_2]^-$, $[MeMeIm]^+[CF_3SO_3]^-$, $[MeMeIm]^+[CF_3CO_2]^-$, $[EtMeIm]^+[BF_4]^-$, $[EtMeIm]^+[CF_3SO_3]^-$, $[EtMeIm]^+[N(CF_3SO_2)_2]^-$, $[EtMeIm]^+[(CN)_2N]^-$, $[BuMeIm]^+[BF_4]^-$, $[BuMeIm]^+[PF_6]^-$, $[BuMeIm]^+[N(CF_3SO_2)_2]^-$, $[PrMeMeIm]^+[N(CF_3SO_2)_2]^-$, $[PrMeMeIm]^+[C(CF_3SO_2)_3]^-$, . . .

2.3.3.2 Pyrrolidinium Based $[nPrMePyrrol]^+[N(CF_3SO_2)_2]^-$, $[nBuMePyrrol]^+[N(CF_3SO_2)_2]^-$, $[nBuMePyrrol]^+[N(CF_3SO_2)_2]$, . . .

2.3.3.3 Tetraalkylammonium Based $[nMe_3BuN]^+[N(CF_3SO_2)_2]^-$, $[nPrMe_3N]^+[N(CF_3SO_2)_2]^-$, $[nOctEt_3N]^+[N(CF_3SO_2)_2]^-$, $[nOctBu_3N]^+[N(CF_3SO_2)_2]^-$, . . .

2.3.3.4 Pyridinium Based $[BuPyr]^+[BF_4]^-$, $[BuPi]^+[N(CF_3SO_2)_2]^-$, . . .

2.3.3.5 Piperidinium Based $[MePrPip]^+[N(CF_3SO_2)_2]^-$, . . .

2.3.3.6 Sulfonium Based $[Et_3S]^+[N(CF_3SO_2)_2]^-$, $[nBu_3S]^+[N(CF_3SO_2)_2]^-$, . . .

2.3.4 Polymer/Gel Electrolytes

Any of the above mentioned types of electrolytes can be immobilized in a polymer or gel matrix leading to so-called polymer- or gel electrolytes. Here, the electrolyte is trapped in through-connected pores of the matrix resulting in thin solid electrolyte films. Typical polymers for such purpose are listed below:

PEO [poly(ethylene oxide)], PAN [poly(acrylonitrile)], PVA [poly(vinyl alcohol)], PMMA [poly(methyl methacrylate)], PVDF [poly(vinylidene fluoride)], PVC [poly(vinyl chloride)], MEEP [poly[bis(methoxy ethoxy ethoxyphosphazene)], PVS [poly(vinyl sulfone)], PVP [poly(vinyl pyrrolidone)], PPO [poly(propylene oxide)], . . .

EXAMPLE 3

Multiple Networks as Electrodes and Charge Collectors

A goal of multiple networks is to take advantage of both the high conductivity of the CNT networks and the high specific capacitance of the coating potentially increasing the capacitance of CNT networks. The second material is sprayed on top of the CNT networks. In such a multiple network the CNT network acts rather as the current collector whereas the additional coating is the active material. This is fundamentally different from composites where all materials are mixed together and potentially interrupting the current paths within the CNT network. The performance of these multiple networks will be discussed in terms of capacitance/area and internal resistance.

3.1 Test Results 3.1.1 Capacitance

In FIG. 31, the capacitance/area before and after coating with different materials is presented.

In general, we have observed two trends for our devices:

(a) When using inorganic coatings, here $MnO_2$ and $TiO_2$, the capacitance decreased compared to the not-coated CNT network. This is in contrast to many publications where high capacitances for these materials have been reported, explained by additional faradaic reactions. However, such pseudo capacitive contributions depend strongly on the electrode/electrolyte combination used. Hence, the electrode/electrolyte system used here needs to be optimized to take advantage of the pseudo capacitive contributions of such coatings.

(b) When using carbon black and polyaniline coatings, the capacitance has been increased significantly. This can be explained by a higher surface area and pseudo capacitive contributions (in particular for polyaniline). The polyaniline coating leads to the highest capacitance of all materials investigated. But the values are constant over consecutive cycles since polyaniline tends to degrade when higher voltages are applied. Consequently, the capacitance is decreasing after a few charge/discharge cycles (FIG. 31, last column). This makes carbon black the most promising active material for the multiple network concept. This way, the high conductivity of the CNT network and the very high surface area of the a-C are combined providing a maximum performance in a reliable device.

3.1.2 Internal Resistance

In general, the internal resistance determines the power density of super-capacitors. It should be minimized for a maximum current boost. In FIG. 32, the internal resistance before and after coating with different materials is presented.

The internal resistance increased for all coatings except for carbon black, where the resistance remained almost unchanged. The increasing resistance can be explained by a lower conductivity of the on-coated material. In addition, the degradation of polyaniline is here obvious too as the internal resistance increased with the number of charge/discharge cycles. This makes carbon black, again, the favorable coating for an increased performance of our devices.

3.1.3 Self Discharge

Self-discharge refers to the gradual decrease of the voltage across the supercapacitor when charged and left unconnected. In the absence of leakage current, self-discharge is mainly due to faradaic reactions. It is assumed that energy cannot be extracted at voltages of less than 0.75 V. In FIG. 33 and FIG. 34, the self-discharge before and after coating with different materials is presented for both a liquid electrolyte (1M $H_3PO_4$) and a polymer electrolyte (PVA/$H_3PO_4$).

In general, two conclusions can be drawn from the self-discharge experiments:

The use of a polymer electrolyte lowers the self-discharge rate significantly compared to a liquid electrolyte (note the different time scales). This can be explained by the limited mobility of ions when trapped in the polymer matrix indicating that diffusion plays an important role for discharge mechanism.

Compared to not-coated CNT network, all additional coatings increase the self-discharge rate leading to a decreased shelf-life of the device. When a polymer electrolyte has been used carbon black coatings decrease the shelf-life the least. In Table 1, the times are listed until the voltage drops below 0.75V and 0.37V, respectively.

3.2 Electrode Materials for Symmetric and Asymmetric Supercapacitors

In the embodiment described above one electrode material has been used. In general, all materials used in electrochemical devices can also be used in supercapacitors. This includes electrode materials used in

- fuel cells
- primary and secondary batteries
- supercapacitors with aqueous, organic, ionic liquid and polymer electrolytes
- organic solar cells For example, carbon (a typical electrode material in supercapacitor, fuel cells) can be combined with metal oxides such as $PbO_2$, $MnO_2$ or Ni(OOH), typical electrode material in batteries. Also, mixtures of various materials in one electrode can be used as well, e.g. as composites, alloys, multiple layers, etc.

Regarding the architecture, a supercapacitor can be either symmetric where both electrodes are of the same material, or asymmetric where the electrodes are of different material.

Examples of typical electrode materials are listed below:

3.2.1 Metals and Metal Oxides:

Zn, Co, Ni, Li, Ru, $TiO_2$, $PbO_2$, $RuO_2$, $IrO_2$, $MnO_2$, $Fe_3O_4$, $In_2O_3$, $WO_3$, $SnO_2$, $V_2O_5$, $Ni(OH)_2$, Ni(OOH), $LiCoO_2$, $Li_4Ti_5O_{12}$, $Ir_{0.3}Mn_{0.7}O_2$, etc.

3.2.2 Carbonaceous Materials:

All types of synthetic and natural carbon structures and its derivatives such as graphite, carbon black, carbon nanotubes, fullerenes, activated carbons, carbon cloths, foams, aerogels, etc.

3.2.3 Conducting Polymers:

Polyaniline, polythiophene, polypyrrol, PEDOT, etc.

EXAMPLE 4

Primary Battery with One Nanotube Electrode and Charge Collector

4.1 Device Preparation

In an embodiment of the present invention one can specifically use single wall carbon nanotubes (SWCNT) as the nanowire. The following device has been fabricated and tested: a battery device based on the $MnO_2$-Zinc system as shown in FIG. 36. The charge collector consists of a thin film of carbon nanotubes created by a filtration process as described in the previous embodiments. A similar SWCNT solution to the one used in this process would also be suitable for other printing processes such as ink jet printing (see Example 2). The active material of the cathode ($MnO_2$) features very poor electrical conductivity resulting in very poor discharge behavior. This problem has been resolved here by mixing the $MnO_2$ powder with carbon nanotubes ($MnO_2$:SWCNT=1:20 (weight:weight) in this case) resulting in a high conductivity and providing conducting paths to the charge collector for the electrons produced in the chemical reaction. A standard electrolyte ($NH_4Cl$:$ZnCl_2$:$H_2O$=26%:8.8%:65.2% weight) and anode (Zinc foil) have been used in this device. Both the separator and the cathode mix have been soaked in electrolyte.

4.2 Test and Results

The discharge curve of the device (FIG. 37) shows a distinguished plateau with a total energy capacity of at least 50 mAh.

EXAMPLE 5

Battery with Two Nanotube Electrodes/Charge Collectors

5.1 Device Preparation

By adding both printable anode and electrolyte, a new fully printable architecture results as shown in FIG. 38. The cathode in the device described earlier consisted of a sheet of zinc. In order to fabricate a printable cathode, zinc powder seems to be the choice of material. The ultimate goal of the battery design is to use as much of the active material as possible in the chemical reaction powering the battery. Thus, the electrode design should not rely on the active material itself for current collection, as the progression of the chemical reaction would make current collection impossible at some point. In conventional batteries, the current collection is guaranteed by having a substantial surplus of zinc (i.e. the zinc can in AA batteries has more mass than can be used by the battery reaction). To minimize the excess weight, we have decided to replace the current collector with a carbon nanotube network in analogy to the cathode design. However, there is one problem with this concept: mixing carbon and zinc results in a chemical reaction, consuming the active anode material (Zn) and thus self-discharging the battery. The solution is to physically separate the zinc form the carbon. We have managed this by applying a thin layer of conductive polymer consisting of Baytron P (aqueous dispersion of poly(3,4-ethylenedioxythiophene) poly(styrene sulfonate) (PEDOT/PSS))) mixed with 5% Dimethyl sulfoxide (DMSO) for enhanced conductivity. While the polymer layer increases the resistance of the current collector by adding an additional layer which is less conductive than the carbon nanotube film by a factor of about 2, the resulting resistance is still significantly better than a pure polymer electrode could manage. Addition of electrolyte to the zinc powder produces a zinc paste that can be applied to the polymer-protected carbon nanotube current collector, resulting in a three layer anode.

The final step towards a fully printable battery is a polymer electrolyte (PEL).

A mixture of 14% (wt) Polyvinyl alcohol (PVA) and 86% (wt) electrolyte (consisting of 16.25 g $NH_4Cl$ and 5.5 g $ZnCl_2$ dissolved in 100 ml water) was heated up to approximately 90° C. in a water bath while being stirred continuously. Subsequently the viscose polymer-electrolyte mixture can be applied to the electrodes. The polymer electrolyte solidifies into a flexible polymer layer upon cooling down.

5.2 Test and Results

The combination of theses layers results in a flexible battery that can be bent. The voltage of the battery stays approximately constant upon bending to different radii confirmed with a multimeter. The battery has been bent around cylinders with diameters of 91 mm, 56 mm, 27.5 mm, and 12.7 mm, in both directions (denoted by positive and negative diameters in table 2) including flat conformations (denoted by d=∞) after every other measurement. As can be seen in Table 2, the voltage fluctuated by up to 4% during the experiment, but without showing an obvious trend towards decreasing voltage. The fluctuations can probably be attributed to changes in the pressure holding together the active materials, the electrolyte and in consequential changes in their contact areas between each other and the CNT nanotube network. In order to verify that the above described bending of the batteries did not damage the batteries, the voltage was checked again the next day. The tested devices still exhibited the expected voltage. No long term investigations have been made to ensure the self discharge of the batteries is not affected by the bending. However, one would expect the batteries to be discharged after a short time if the bending seriously damaged the devices (e.g. produced a short circuit between the electrodes). Other, smaller possible disadvantages to the lifetime of the devices caused by the bending, e.g. through dislocation of parts of the active material, should be easily countered by adding a binder to the active material mix.

In order to evaluate the different components, measurements of devices made from Zinc sheet/PEL/$MnO_2$ have been compared to devices made from Zinc powder/PEL/$MnO_2$ in addition to the measurements shown earlier (Zinc sheet/liquid electrolyte/$MnO_2$). As can be seen in FIG. 39, the batteries including PEL are not able to exhaust as much of the active material ($MnO_2$) as the ones with liquid electrolyte. There seems to be no difference between devices using Zn sheet and devices using the flexible Zn powder electrode concerning the efficiency. This indicates that the reason for this lies in the use of the polymer electrolyte. Use of a different polymer, electrolyte, mixing ratio and/or geometry might resolve this problem. The efficiency reached in our devices has not exceeded 40% so far. This is a notable contrast to the liquid electrolyte devices reported earlier, which reached values of up to 95%. The measured voltage in these devices is somewhat lower, which might be caused by the additional resistance introduced due to the CNT network resistance, the polymer layer resistance and contact resistances between those layers, the zinc powder and the PEL.

5.3 Materials for Alternative Batteries

In the example described above, one electrode material was used.

Other combinations of active materials/electrolytes could be used with the design described here. Some of the most common combinations, without limitation, are listed below:

5.3.1 Primary Batteries 5.3.1.1 Zinc-Carbon Batteries:
Active materials: Zinc (Zn) and manganese dioxide ($MnO_2$).
Electrolyte: Instead of the described electrolyte ($NH_4Cl$, $ZnCl_2$ and water), one could use either $ZnCl_2$ in water (without $NH_4Cl$) or an aqueous solution of KOH (alkaline battery).

5.3.1.2 Zinc/Air Batteries:
Active materials: Zinc (Zn) and oxygen ($O_2$, air).
Electrolyte: KOH (aqueous solution).

5.3.1.3 Mg/$MnO_2$ Batteries:
Active materials: Magnesium (Mg) and manganese dioxide ($MnO_2$).
Electrolyte: Aqueous solution of $MgBr_2$ and $Mg(ClO_4)$.

5.3.1.4 Zn/Hgo Batteries
Active materials: Zinc (Zn) and mercury oxide (HgO).
Electrolyte: KOH or NaOH (aqueous solutions).

5.3.1.5 Aluminum Batteries:
Active materials: Aluminum (Al) and oxygen ($O_2$, air).
Electrolyte: several possible electrolytes, including aqueous KOH.

5.3.1.6 Cd/Hgo Batteries:
Active materials: Cadmium (Cd) and mercury oxide (HgO).
Electrolyte: KOH (aqueous solution).

5.3.1.7 Zn/$Ag_2O$ Batteries:
Active materials: Zinc (Zn) and silver oxide ($Ag_2O$ or AgO).
Electrolyte: KOH or NaOH (aqueous solutions).

5.3.1.8 Lithium Batteries:
Active materials: Lithium (Li) and sulfur dioxide ($SO_2$), manganese dioxide ($MnO_2$), $FeS_2$.
Electrolyte: Organic solvent, salt solution or $SOCl_2$ with $AlCl_4$ respectively.

5.3.1.9 Solid State Batteries:
Active materials: Lithium (Li), $I_2$(P2VP).
Electrolyte: solid 5.3.2 Secondary Batteries 5.3.2.1 Lithium Ion Batteries:
Active materials: Lithium-metal-oxides (such as $LiCoO_2$, $Li_{1-x}CO_{1-y}M_yO_2$ etc.) or phosphate based (e.g. $LiFePO_4$, $Li_3V2(PO_3)_3$) and usually carbon (sometimes nitrides, sulfides, phosphides or oxides such as CuO)
Electrolyte: lithium-salt electrolytes (such as $LiPF_6$, $LiBF_4$, or $LiClO_4$) in organic solvents (aqueous or as polymer electrolytes).

5.3.2.2 Silver-Zinc Batteries:
Active materials: Zinc (Zn) and silver oxide (AgO).
Electrolyte: KOH (aqueous solution).

5.3.2.3 Zinc-Carbon:
Active materials: Zinc (Zn) and manganese dioxide ($MnO_2$).
Electrolyte: KOH (aqueous solution).

5.3.2.4 Lead-Acid Batteries:
Active materials: Lead (Pb) and lead dioxide ($PbO_2$).
Electrolyte: $H_2SO_4$ (aqueous solution).

5.3.2.5 Nickel-Cadmium Batteries:
Active materials: Cadmium (Cd) and NiOOH.
Electrolyte: KOH (aqueous solution).

5.3.2.6 Nickel-Iron Battery:
Active materials: Iron (Fe) and NiOOH.
Electrolyte: KOH (aqueous solution).

5.3.2.7 Nickel-Metal Hydride Battery:
Active materials: Metal hydride (MH) and NiOOH.
Electrolyte: KOH (aqueous solution).

5.3.2.8 Nickel-Zinc Battery:
Active materials: Zinc (Zn) and NiOOH.
Electrolyte: KOH (aqueous solution).

5.3.2.9 Nickel-Hydrogen Battery:
Active materials: Hydrogen ($H_2$) and NiOOH
Electrolyte: KOH (aqueous solution).

5.3.2.10 Polymers:
Active materials: Organic functional polymers.

EXAMPLE 6

Multi Layered Nanowire Networks

The following two systems of dual layer nanowire networks have been produced:
1. Carbon nanotube network on top of a silver nanowire network.
2. PEDOT layer on top of a silver nanowire network.

The Ag nanowire networks have been fabricated using an airbrush to apply the nanowire suspension onto a PET substrate. Since the Ag nanowires are covered by a polymer, the network should be annealed to approximately 200 ° C. in order to achieve good conductivity.

After measuring the resistance [Ω/cm] of the Ag nanowire network using a multimeter and copper clips, a second layer (CNT or PEDOT) were applied on top of the silver. For comparison, the carbon nanotubes and conducting polymer was also applied to a fresh substrate (PET) at the same time (same thickness, same preparation etc.). The new resistance [Ω/cm] of the resulting double layer was then determined in the same way as above. FIG. 39 shows the resulting resistances. The contact resistance between the two networks is obviously smaller than the resistance of the less conducting network (CNT, PEDOT). In the case of Ag NW network/CNT network, the resulting resistance is about the same (maybe even less, but not significant because of the error bars, not shown in the chart) as the starting resistance. As an additional positive effect of the second layer, the resulting structures were more resistant against physical damage than the original Ag nanowire films.

From the foregoing it can be seen that the present invention can be embodied in various ways, including, but not limited to, the following:

1. An energy storage device, comprising: an electrode; a charge collector; and an electrolyte; wherein the electrode is in physical contact with the electrolyte and the charge collector; and wherein at least one of the electrode and the charge collector comprises a nanostructured network.

2. The energy storage device of embodiment 1, wherein the electrode comprises a first nanostructured network; and wherein the charge collector comprises a second nanostructured network.

3. The energy storage device of embodiment 2, wherein the energy storage device is flexible.

4. The energy storage device of embodiment 3, wherein at least one of the first nanostructured network and the second nanostructured network has a conductivity of at least about 500 S/cm.

5. The energy storage device of embodiment 4, wherein at least one of the first nanostructured network and the second nanostructured network has a conductivity of at least about 100 S/cm and less than about 10,000 S/cm.

6. The energy storage device of embodiment 5, wherein at least one of the first nanostructured network and the second nanostructured network comprises a plurality of electrically conducting nanowires.

7. The energy storage device of embodiment 6, wherein at least one of the first nanostructured network and the second nanostructured network comprises a plurality of carbon nanotubes.

8. The energy storage device of embodiment 5, wherein the first nanostructured network and the second nanostructured network both comprise networks of electrically conducting nanowires.

9. The energy storage device of embodiment 8, wherein the first nanostructured network has a different nanostructure density than the second nanostructured network.

10. The energy storage device of embodiment 9, wherein the first nanostructured network has a lower nanostructure density than the second nanostructured network.

11. An energy storage device, comprising: an electrode; a charge collector; an electrical contact pad; and an electrolyte; wherein the electrode is in physical contact with the electrolyte and the charge collector; wherein the electrical contact pad is in physical contact with the charge collector; and wherein the electrode and the charge collector comprise a nanostructured network.

12. The energy storage device of embodiment 11, wherein the nanostructured network comprises electrically conducting nanowires and has a conductivity of at least about 100 S/cm and less than about 10,000 S/cm.

13. The energy storage device of embodiment 12, wherein the electrolyte penetrates into a first layer of the nanostructured network, and wherein the electrolyte does not penetrate into a second layer of the nanostructured network.

14. The energy storage device of embodiment 13, wherein the second layer of the nanostructured network has a higher nanostructure density than the first layer of the nanostructured network.

15. The energy storage device of embodiment 14, wherein the nanostructured network comprises a network of carbon nanotubes, and wherein the energy storage device is flexible.

16. An energy storage device, comprising: a first electrode and a second electrode; a first charge collector and a second charge collector; and an electrolyte, wherein the first electrode is in physical and electrical contact with the first charge collector; wherein the second electrode is in physical and electrical contact with the second charge collector; wherein the electrolyte is in physical contact with the first electrode and the second electrode; and wherein the first electrode and the first charge collector comprise a first nanostructured network.

17. The energy storage device of embodiment 16, further comprising: a first electrical contact pad and a second electrical contact pad; wherein the first electrical contact pad is in physical and electrical contact with the first charge collector; wherein the second electrical contact pad is in physical end electrical contact with the second charge collector; and wherein the first electrical contact pad and the second electrical contact pad are connected to an external circuit.

18. The electrical storage device of embodiment 17, wherein the first nanostructured network comprises a network of electrically conductive nanowires.

19. The energy storage device of embodiment 18, wherein the second electrode and the second charge collector comprise a second nanostructured network, and wherein at least one of the first nanostructured network and the second nanostructured network comprises a network of carbon nanotubes.

20. The energy storage device of embodiment 19, wherein at least one of the first nanostructured network and the second nanostructured network further comprises a plurality of metal oxide nanostructures.

The current invention is not limited to the specific embodiments of the invention illustrated herein by way of example, but is defined by the claims. One of ordinary skill in the art would recognize that various modifications and alternatives to the examples discussed herein are possible without departing from the scope and general concepts of this invention.

TABLE 1

Self-discharge rates for CNT based supercapacitors after 30 min charging to 1 V in either a polymer electrolyte (2nd and 3rd column) or a liquid electrolyte (last two columns). Note that the time scales are different.

| | Electrolyte | | | |
| --- | --- | --- | --- | --- |
| | PVA/H3PO4 | | 1M H3PO4 | |
| Electrode material | t (0.75) [min] | t (0.37) [h] | t (0.75) [min] | t (0.37) [min] |
| CNT only | 60 | 58 | 12 | 192 |
| CNT/MnO2 | 18 | 3 | 4.5 | 11 |
| CNT/TiO2 | 33 | 26 | 1.5 | 12 |

TABLE 1-continued

Self-discharge rates for CNT based supercapacitors after 30 min charging to 1 V in either a polymer electrolyte (2nd and 3rd column) or a liquid electrolyte (last two columns). Note that the time scales are different.

| Electrode material | Electrolyte | | | |
|---|---|---|---|---|
| | PVA/H3PO4 | | 1M H3PO4 | |
| | t (0.75) [min] | t (0.37) [h] | t (0.75) [min] | t (0.37) [min] |
| CNT/Carbon Black | 40 | 42 | 2 | 9 |
| CNT/Polyaniline | 10 | 10 | 0.5 | 1 |

TABLE 2

Bending measurement. While bending the device to different curvatures, both the terminal voltage U and the dc resistance of the battery R (to detect possible short circuits) have been measured. The terminal voltage seems to stay stable at approximately 1.3 Volts and no shorts (R ≠ ∞) have been detected during the experiment.

| d [mm] | curvature [mm$^{-1}$] | R [Ω] | U [V] |
|---|---|---|---|
| ∞ | 0 | ∞ | 1.357 |
| 91 | 0.01 | ∞ | 1.365 |
| 56 | 0.02 | ∞ | 1.310 |
| ∞ | 0 | ∞ | 1.329 |
| 27.5 | 0.04 | ∞ | 1.334 |
| 12.7 | 0.08 | ∞ | 1.329 |
| ∞ | 0 | ∞ | 1.331 |
| −91 | −0.01 | ∞ | 1.337 |
| −56 | −0.02 | ∞ | 1.333 |
| ∞ | 0 | ∞ | 1.315 |
| −27.5 | −0.04 | ∞ | 1.338 |
| −12.7 | −0.08 | ∞ | 1.346 |
| ∞ | 0 | ∞ | 1.301 |

We claim:

1. A device for use as an electrode or charge collector in an energy storage device, the device, comprising:
    (a) an electrical contact;
    (b) a first nanostructured network of a nanoscale electrically conducting material connected to the electrical contact; and
    (c) a second nanostructured network of an electrochemically active material in contact with the first nanostructured network;
    (d) wherein said first nanostructured network comprises:
        a layer of a first electrically conducting material; and
        a layer of a second electrically conducting material in contact the layer of a first electrically conducting material;
    wherein said first and second electrically conducting materials have different densities.

2. A device as recited in claim 1, wherein said nanoscale electrically conducting material is selected from the group of conductors consisting of carbon nanotubes, fullerenes, graphene, graphene flakes, metal nanowires, Ag nanowires, a mixture of two carbonaceous materials having different electrical conducting properties, a mixture of a carbonaceous material and a metal material, and conductive polymer nanowires.

3. A device as recited in claim 1, wherein said electrochemically active material is selected from the group of materials consisting of polyaniline, polythiophene, polypyrrol, PEDOT and carbon black.

4. A device as recited in claim 1, wherein said electrochemically active material is selected from the group of materials consisting of Zn, Co, Ni, Li, Ru, $TiO_2$, $PbO_2$, $RuO_2$, $IrO_2$, $MnO_2$, $Fe_3O_4$, $In_2O_3$, $WO_3$, $SnO_2$, $V_2O_5$, $Ni(OH)_2$, $Ni(OOH)$, $LiCoO_2$, $Li_4Ti_5O_{12}$, and $Ir_{0.3}Mn_{0.7}O_2$.

5. A device as recited in claim 1:
    wherein said first layer of electrically conducting material comprises carbon nanotubes; and
    wherein said second layer of electrically conducting material comprises carbon black.

6. A device as recited in claim 1:
    wherein said first layer of electrically conducting material comprises carbon nanotubes having a first density; and
    wherein said second layer of electrically conducting material comprises carbon nanotubes having a second density.

7. A device as recited in claim 1:
    wherein said first layer of electrically conducting material comprises metal nanowires; and
    wherein said second layer of electrical conducting material comprises carbon nanotubes.

8. A device as recited in claim 1:
    wherein said first layer of electrically conducting material comprises a carbonaceous material having a first electrical conducting property; and
    wherein said second layer of electrically conducting material comprises a carbonaceous material having a second electrical conducting property different than said first electrical conducting property.

9. A device as recited in claim 1, further comprising a conductive polymer protective layer disposed between the first nanostructured network and the second nanostructured network.

10. A device as recited in claim 1, wherein the first nanostructured network has a thickness that is greater or less than the second nanostructured network.

11. A device as recited in claim 1, wherein the first nanostructured network interpenetrates the second nanostructured network to form a composite structure.

12. An energy storage device, comprising:
    (a) a first electrode;
    (b) a second electrode; and
    (c) an electrolyte between the first and second electrodes;
    (d) wherein at least one said electrode comprises:
        an electrical contact;
        a first nanostructured network of a nanoscale electrically conducting material connected to the electrical contact; and
        a second nanostructured network of an electrochemically active material in contact with the first nanostructured network;
    (e) wherein said first nanostructured network comprises:
        a layer of a first electrically conducting material; and
        a layer of a second electrically conducting material in contact the layer of a first electrically conducting material;
    wherein said first and second electrically conducting materials have different densities.

13. The energy storage device of claim 12, wherein said nanoscale electrically conducting material is selected from the group of conductors consisting of carbon nanotubes, fullerenes, graphene, graphene flakes, metal nanowires, Ag nanowires, a mixture of two carbonaceous materials having different electrical conducting properties, a mixture of a carbonaceous material and a metal material, and conductive polymer nanowires.

14. The energy storage device of claim 12, wherein said electrochemically active material is selected from the group of materials consisting of polyaniline, polythiophene, polypyrrol, PEDOT and carbon black.

15. The energy storage device of claim 12, wherein said electrochemically active material is selected from the group of materials consisting of Zn, Co, Ni, Li, Ru, $TiO_2$, $PbO_2$, $RuO_2$, $IrO_2$, $MnO_2$, $Fe_3O_4$, $In_2O_3$, $WO_3$, $SnO_2$, $V_2O_5$, $Ni(OH)_2$, $Ni(OOH)$, $LiCoO_2$, $Li_4Ti_5O_{12}$, and $Ir_{0.3}Mn_{0.7}O_2$.

16. The energy storage device of claim 12:
wherein said first layer of electrically conducting material comprises carbon nanotubes; and
wherein said second layer of electrically conducting material comprises carbon black.

17. The energy storage device of claim 12:
wherein said first layer of electrically conducting material comprises carbon nanotubes having a first density; and
wherein said second layer of electrically conducting material comprises carbon nanotubes having a second density.

18. The energy storage device of claim 12:
wherein said first layer of electrically conducting material comprises metal nanowires; and
wherein said second layer of electrical conducting material comprises carbon nanotubes.

19. The energy storage device of claim 12:
wherein said first layer of electrically conducting material comprises a carbonaceous material having a first electrical conducting property; and
wherein said second layer of electrically conducting material comprises a carbonaceous material having a second electrical conducting property different than said first electrical conducting property.

20. The energy storage device of claim 12, further comprising a conductive polymer protective layer disposed between the first nanostructured network and the second nanostructured network.

21. The energy storage device of claim 12, wherein the first nanostructured network has a thickness that is greater or less than the second nanostructured network.

22. The energy storage device of claim 12, wherein the first nanostructured network interpenetrates the second nanostructured network to form a composite structure.

* * * * *